United States Patent
Goldstein et al.

(10) Patent No.: US 7,720,721 B1
(45) Date of Patent: May 18, 2010

(54) METHOD AND SYSTEM FOR ANALYZING USER INTERACTION TO IDENTIFY DOCUMENTS ASSOCIATED WITH DISSIMILAR ITEMS THAT MAY CONTAIN SYNONYMS

(75) Inventors: Michel Goldstein, Bellevue, WA (US); Walter Tseng, Seattle, WA (US); Randall Puttick, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 11/694,721

(22) Filed: Mar. 30, 2007

Related U.S. Application Data

(63) Continuation-in-part of application No. 11/617,131, filed on Dec. 28, 2006.

(51) Int. Cl.
*G06Q 30/00* (2006.01)
(52) U.S. Cl. .......................................... 705/26; 705/27
(58) Field of Classification Search ................... 705/26, 705/27
See application file for complete search history.

(56) References Cited

U.S. PATENT DOCUMENTS

| | | | |
|---|---|---|---|
| 5,675,819 A * | 10/1997 | Schuetze | 704/10 |
| 6,006,225 A * | 12/1999 | Bowman et al. | 707/5 |
| 6,366,910 B1 * | 4/2002 | Rajaraman et al. | 707/5 |
| 7,024,416 B1 * | 4/2006 | Ponte | 707/101 |
| 7,082,426 B2 * | 7/2006 | Musgrove et al. | 707/3 |
| 7,113,943 B2 * | 9/2006 | Bradford et al. | 707/4 |

OTHER PUBLICATIONS

Feldman, Susan, "The Answer Machine" Searcher: The Magazine for Database Professionals Jan. 2000, v8, n1, p. 58.*
Gauch, et al., "A Corpus Approach for Automatic Query Expansion and Its Extension to Multiple Databases", Jul. 1999, Association for Computing Machinery, Inc., ACM transaction on Information Systems, vol. 17, No. 3, pp. 250-269.

* cited by examiner

*Primary Examiner*—Jeffrey A Smith
*Assistant Examiner*—Matthew Zimmerman
(74) *Attorney, Agent, or Firm*—Lee & Hayes, PLLC

(57) ABSTRACT

Tools and techniques are described for analyzing interactions to identify dissimilar items that may contain synonyms. Methods described herein may retrieve activity records that represent interactions between a visitor and a server-based system, and may identify within the activity records inputs that the visitor provided during the interaction. The methods may identify items within the activity record that are associated with the inputs, and may access additional activity records that also contain the same inputs. The methods may then identify additional items within the additional activity records that are associated with this same input, and may establish similarity ratings for the two items, with the similarity ratings indicating a likelihood that documents respectively associated with the items contain synonyms.

55 Claims, 17 Drawing Sheets

METHOD AND SYSTEM FOR ANALYZING USER INTERACTION TO IDENTIFY DOCUMENTS ASSOCIATED WITH DISSIMILAR ITEMS THAT MAY CONTAIN SYNONYMS

CROSS-REFERENCE TO RELATED APPLICATIONS

This application is a continuation-in-part (CIP) of pending U.S. application Ser. No. 11/617,131, filed on 28 Dec. 2006, entitled "Detecting Synonyms and Merging Synonyms into Search Indexes." The contents of this parent application are incorporated by this reference as if set forth verbatim herein, and the benefit of the filing date of this parent application are hereby claimed to the fullest extent permitted by 35 U.S.C. §120.

BACKGROUND

As document content becomes increasingly available over wide area networks such as the Internet, indexing and categorizing this content for efficient search becomes more of a challenge for organizations that post content on, for example, web pages. This challenge is likely to become more of an issue as more organizations make information available via electronically searchable databases.

Another challenge with enabling users to electronically search for content is supporting searches for synonyms. Under some approaches, a search engine might receive a given input keyword search, and expand the keywords by identifying synonyms for the keywords at the time that the search is requested. Afterwards, the search engine may perform individual keyword searches for each identified synonym.

While the foregoing approaches may work suitably in some circumstances, there are nevertheless opportunities for improvement, as described further in this application.

SUMMARY

Tools and techniques are described for analyzing interactions to identify dissimilar items that may contain synonyms. Methods described herein may retrieve activity records that represent interactions between a visitor and a server-based system, and may identify within the activity records inputs that the visitor provided during the interaction. The methods may identify items within the activity record that are associated with the inputs, and may access additional activity records that also contain the same inputs. The methods may then identify additional items within the additional activity records that are associated with this same input, and may establish similarity ratings for the two items, with the similarity ratings indicating a likelihood that documents respectively associated with the items contain synonyms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to tools and techniques related to detecting synonyms and merging synonyms into search indexes. The description of these tools and techniques begins with an overview of illustrative operating environments for detecting synonyms and merging synonyms into search indexes, presented with FIG. 1.

Figure 1:
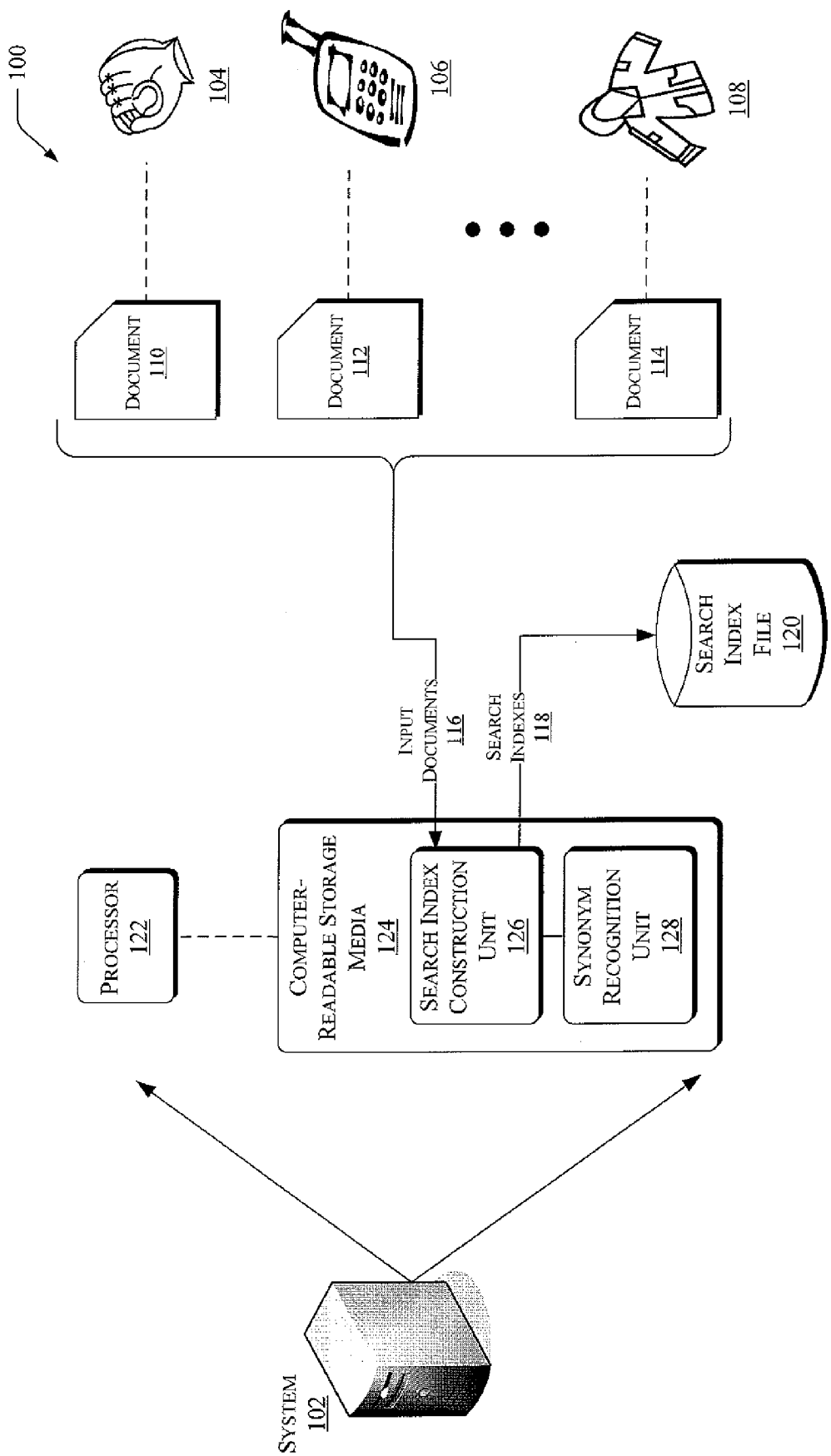
FIG. 1 is a block diagram of components and data flows relating to illustrative operating environments for detecting synonyms and merging synonyms into search indexes.

FIG. 1 illustrates components and data flows relating to illustrative operating environments 100 for detecting synonyms and merging synonyms into search indexes. The operating environments may include a system 102 that includes one or more servers or other suitable computer-based processing systems, as shown in FIG. 1. For ease of reference and discussion, but not limitation, this description refers to the system and the server 102 interchangeably.

The operating environments 100 may provide at least the server 102 as part of infrastructure that supports one or more resources or sites that are accessible over a network, for example, websites. In some implementations, the website may be a merchant website that offers goods and/or services (collectively and interchangeably referred to as "items") to customers. FIG. 1 shows examples of such goods at 104, 106, and 108. The goods may be organized into categories such as, without limitation, sporting goods (e.g., including baseball glove 104), electronics (e.g., including wireless device 106), apparel (e.g., including outerwear 108), or the like.

The various goods or services offered by the website may be associated with respective documents. These documents may contain descriptive content that facilities posting information about the documents or items accessible through the website. For example, FIG. 1 shows a document 110 that provides information about the baseball glove 104, a document 112 that provides information about the wireless device 106, and a document 114 that provides information about the outerwear 108. In some instances, but not necessarily all instances, manufacturers of the goods 104-108 may provide these documents 110-114.

It is also noted that the documents and goods shown in FIG. 1 are chosen only for ease of description and illustration, but not for limitation. More specifically, the operating environments described herein may process any number of documents, which may or may not be associated with the goods or services. For example, in some instances, the documents 110-114 may represent individual web pages on a non-merchant site.

These documents may be provided to the website or to the server 120 on an ongoing basis, as new products are made available through the website. FIG. 1 represents these input documents generally at 116, and for convenience only, the documents 116 are shown as input to the server 102. As detailed further below, the server 102 processes these documents, and indexes them for search. As part of this indexing process, the server may generate search indexes or indices, denoted generally at 118, based on these input documents 116. Search indexes for the documents may be collected and stored in a search index file 120.

Turning to the server 102 in more detail, the server may include one or more processors 122 that communicate with one or more instances of computer-readable storage media 124. The processors may read data from or write data to portions of the computer-readable storage media in performing any of the functions described herein. Additionally, the computer-readable storage media may contain software instructions that, when loaded into the processors, cause the server to perform any of the functions described herein.

The storage media 124 may contain one or more software modules that define a search index construction unit 126, which represents a software-based implementation of suitable instructions for processing the documents 110-114 and generating search indexes therefrom. The storage media 124 may also contain one or more software modules that define a synonym recognition unit 128, which represents a software-based implementation of suitable instructions for recognizing synonyms appearing within the documents, and incorporating those recognized synonyms into the search indexes.

In illustrating the storage media 124, FIG. 1 does not exclude hardware or firmware implementations of the search index construction unit 126 and the synonym recognition unit 128. Instead, FIG. 1 provides possible software-based implementations. However, some or all of the search index construction unit 126 and the synonym recognition unit 128 may be implemented with suitable electrical or electronic circuits. Additionally, the search index construction unit 126 and the synonym recognition unit 128 may reside on separate media or circuits.

Figure 2:
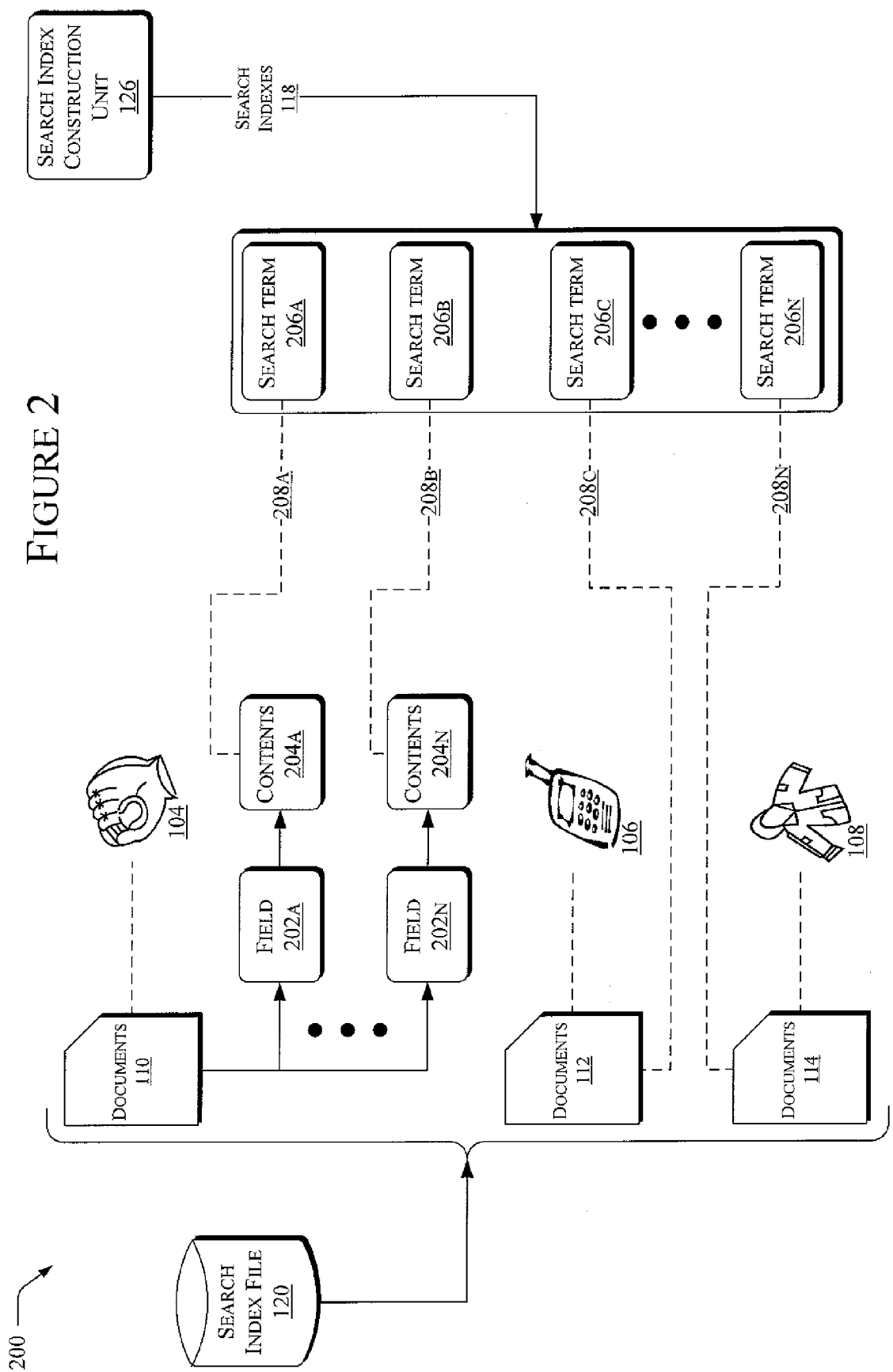
FIG. 2 is a block diagram of data structures suitable for implementing a search index file, such as the search index file shown in FIG. 1.

Having described the operating environments 100 in FIG. 1, the discussion now proceeds to a description of more detail related to the search index file 120, now presented with FIG. 2.

FIG. 2 illustrates data structures 200 suitable for implementing a search index file, such as the search index file shown in FIG. 1 at 120. For convenience and conciseness of description, but not to limit possible implementations, certain items described previously are carried forward into FIG. 2, and denoted by the same reference numbers.

The search index file may enable searches conducted across a plurality of documents, such as the documents 110-114. These documents may be represented in the search index file by respective data structures, denoted generally by the graphic elements for the documents 110-114 as shown in FIG. 2. In example implementations involving merchant websites, the various items accessible through the website may be associated with a respective descriptive document. In turn, the descriptive documents may be represented with suitable data structures.

While FIGS. 1 and 2 show one instance of the documents 110, 112, and 114 for conciseness of illustration, it is understood that implementations of the description herein could include any number of documents 110, 112, and 114. Thus, the description herein refers to these documents in plural number, without limiting these possible implementations.

As shown in FIG. 2, sporting goods items, such as the baseball glove 104, are associated with respective data structures for the documents 110. Likewise, electronics, such as the wireless device 106, are associated with respective data structures for the documents 112. Finally, in the example shown in FIG. 2, apparel, such as the outerwear 108, are associated with respective data structures for the documents 114.

Turning to the data structures for the documents in more detail, FIG. 2 shows illustrative fields and contents for a data structure corresponding to the document 110. Recalling that the document 110 relates to, for example, the baseball glove 104, the data structure may include one or more fields 202. For convenience only, FIG. 2 shows two fields 202A and 202N, but implementations of the data structures could contain any number of fields.

The fields may be populated by a manufacturer of the goods or services represented by the document 110, or by other parties or processes as appropriate in different implementations. In the baseball glove example, information in the different fields 202 may convey the size of the glove, the color of the glove, the material from which the glove is manufactured, the type of the glove (fielder, catcher, or the like), manufacturer name or identifier, a brand name, SKU or UPC codes, or other parameters of interest. Additionally, a field 202 may provide a textual description or title of the goods or services represented by the document 110.

As will be understood, these examples of different fields are given only for ease of discussion, but not to limit implementations of the description herein. Other fields may be included without departing from the spirit and scope of the description.

The fields 202 may contain data or other information, denoted generally in FIG. 2 as field contents 204. For convenience only, FIG. 2 shows two instances of field contents 204a and 204n, but implementations of the data structures could contain any number of field contents.

Continuing with the example of the baseball glove above, contents of "color" fields may include the text "brown," "dark beige," "black," or the like. Contents of SKU or UPC fields may contain unique binary, numeric, or alphanumeric identifiers for the baseball glove. Contents of a description field may characterize the goods as a "baseball glove" or a "baseball mitt," for example.

In similar manner, other goods or services (e.g., the example goods 106 and 108) may be represented in data structures corresponding to the documents 112-114. More specifically, these data structures may contain fields and contents similar to those shown at 202 and 204 as discussed above.

The search index file may also include one or more search index terms 206, which serve as key fields or indexes that facilitate searching, for example, the content fields 204. In some instances, whoever provides the documents 110-114 may also specify the fields whose contents are used as search terms. FIG. 2 shows examples of search index terms 206*a*, 206*b*, 206*c*, and 206*n*. As indicated by dashed lines 208*a* and 208*b*, the field contents 204*a* and 204*b* may be presented as search index terms 206*a* and 206*b*, respectively. Similarly, dashed lines 208*c* and 208*n* indicate that field contents from the documents 112 and 114 may be presented as search index terms 206*c* and 206*n*, respectively.

The foregoing discussion pertains to pre-processing that may be performed to prepare for responding to keyword searches submitted to, for example, a website by visitors to the website. However, the discussion now presents a brief example of a search scenario, before returning to additional description of pre-processing techniques.

Returning to the baseball glove example, assume that a visitor to the website submits a keyword search including the terms "baseball glove." In responding to this search, the website may submit the search terms "baseball glove" to the search index file 120. In turn, the website (or a server provided as part thereof) may compare the input search terms "baseball glove" to the search index terms 206. Assume that a field 202*a* is a product description field, that the field contents 204*a* contains the text "baseball glove," and that these field contents are presented as a search index term 206*a*. In this example, the website may match the input search terms "baseball glove" to the text "baseball glove" as it appears in the search index term 206*a*. In this event, the website may retrieve the document (e.g., 110) that corresponds to the matching search index term, and return this document as a response to the query.

Figure 3:
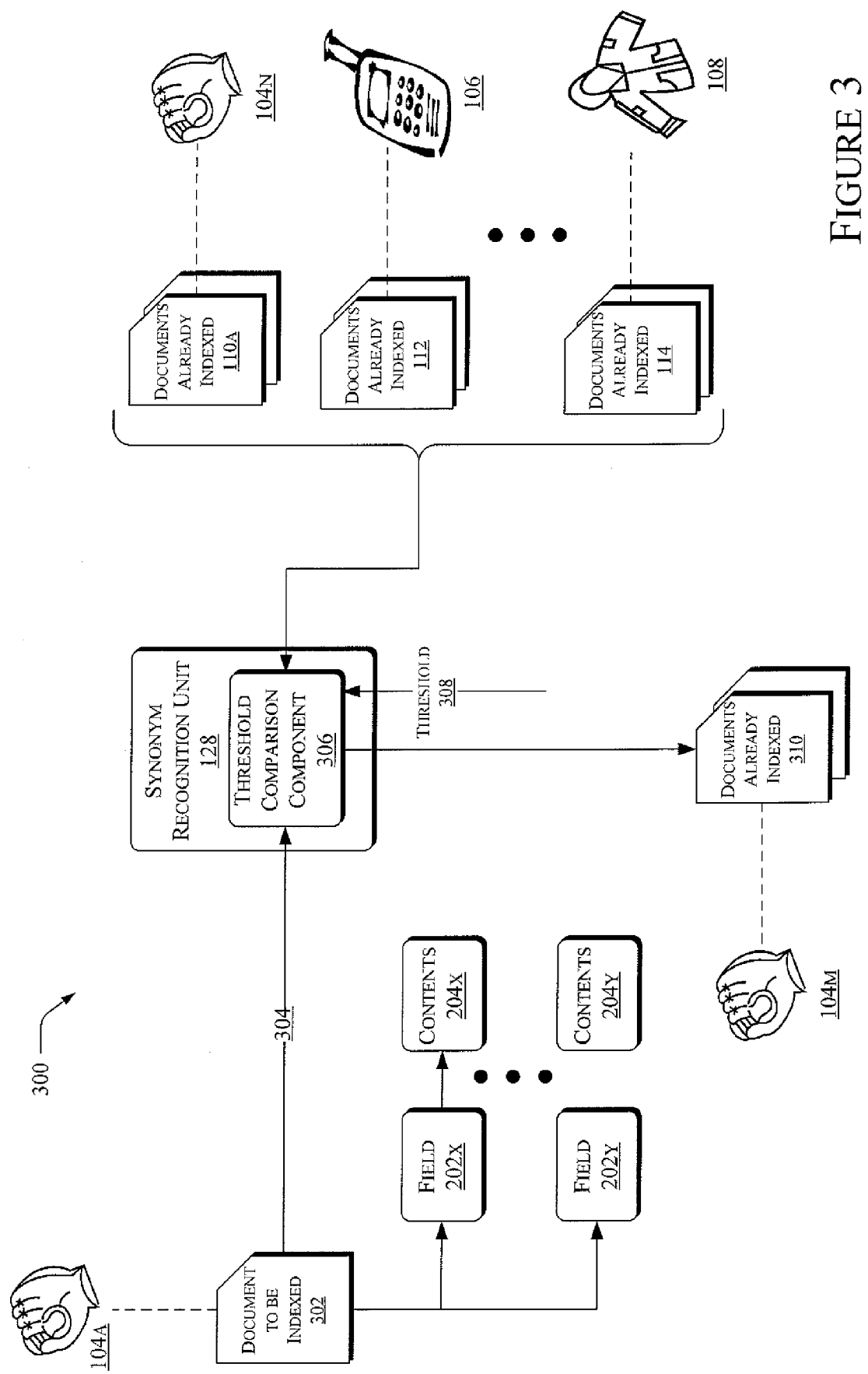
FIG. 3 is a block diagram of components and data flows related to indexing an input document into the search index file.

Having described the data structures suitable for implementing a search index file in FIG. 2, the discussion now proceeds to a description of components and data flows related to indexing an input document into the search index file, now presented with FIG. 3.

FIG. 3 illustrates components and data flows 300 related to indexing an input document into a search index file. For convenience and conciseness of description, but not to limit possible implementations, certain items described previously are carried forward into FIG. 3, and denoted by the same reference numbers.

FIG. 3 denotes at 302 an input document to be indexed into a search index file. FIG. 1 shows an example of a search index file at 120. The input document 302 may include one or more fields, two examples of which are shown at 202*x* and 202*y*. These fields may contain contents, denoted generally at 204*x* and 204*y*. The input document may be associated with a particular type of good or service, represented generally in FIG. 3 at 104*a*. In the example shown in FIG. 3, the good may be a particular baseball glove. Thus, the fields 202 and the contents 204 may convey various information or parameters relating to the baseball glove.

The search index construction unit 126 may receive the document 302 for indexing, as indicated by the line 304. The search index construction unit may include a threshold comparison component 306, which compares the fields and/or contents of the input document 302 to the fields and/or contents of a plurality of other documents that have already been indexed into the search index file 120. FIG. 3 shows examples of these existing documents at 110*a*, 112, and 114. Assuming a general website implementation, these existing documents may represent individual web pages or other content available through the website merchant. Assuming a website merchant implementation, these existing documents may represent different goods or services that are accessible or available through the website merchant, such as sporting goods represented at 104*n*, electronic items represented at 106, apparel represented at 108, or the like. As described above, these goods may be associated with respective categories.

The existing documents 110*a*, 112, and 114 may contain fields and/or contents, similar to those shown in FIGS. 2 and 3 at 202 and 204. One function of the threshold comparison component 306 is to compare the fields and/or contents of the input document 302 to those of the existing documents 110*a*, 112, and 114. As detailed further herein, this comparison facilitates the identification of terms appearing within the input document that may be synonyms with terms appearing within the existing documents. However, the likelihood of such synonyms appearing in the input document may depend on how closely the input document relates to the existing documents. Assume, for example, that the input document 302 relates to a baseball glove, and that the existing documents 110*a*, 112, and 114 relate to sporting goods, electronics, and apparel, respectively. In this case, terms appearing in the input document 302 may most likely be synonyms with terms appearing in the existing document 110*a*, because both documents relate to sporting goods.

The threshold comparison component 306 performs a preliminary thresholding or filtering on the existing documents 110*a*, 112, and 114. More specifically, the threshold comparison component may determine which of these existing documents are sufficiently closely related to the input document 302 that terms appearing within these documents may be synonyms for one another. The threshold comparison component may perform this thresholding or filtering operation by comparing the fields and/or contents of the input document (e.g., 302), in turn, with the fields and/or contents of the existing documents (e.g., 110*a*, 112, and 114). If the documents being compared contain fields that have similar names, types, contents, or the like, then the documents may pertain to subject matter this is closely related, such that synonyms may appear within the documents.

In this manner, the threshold comparison component may capitalize on the proposition described in the example introduced above involving the input document 302 and the existing document 110*a*. More specifically, if both documents relate to sporting goods, it is more likely that these documents include similar fields and/or contents. Thus, the threshold comparison component may determine how many fields and/or contents are similar between the input document 302 and the existing document 110*a*.

To make the foregoing threshold determination, the threshold comparison component may receive a threshold parameter as input, denoted generally at 308. This threshold 308 indicates how similar the fields and/or contents of the input document 302 and the existing document 110*a* are to be, before these two documents are related enough to contain likely synonyms. Put differently, the threshold 308 specifies how similar the fields and/or contents of the existing documents (e.g., 110*a*, 112, and 114) are to those of the input document (e.g., 302) for the existing document to survive the filtering or thresholding process.

In possible implementations, the threshold 308 may be specified as a percentage, expressing how closely the two documents being compared relate to one another. For example, a threshold value of 75% may indicate that approximately 75% of the fields and/or content within the input document 302 match or are similar to fields and/or content within the existing documents 110*a*, 112, or 114. For example, the input document 302 and one or more of the existing documents 110*a*, 112, or 114 may all contain fields that list the colors, manufacturers, brands, types, SKUs/UPCs, or other parameters of the corresponding items. This scenario provides but one example of matching or similar fields between or among the fields of the various documents.

In an example of dissimilarity, one document might contain a field for a relatively esoteric parameter pertaining to a given item. However, the other documents may not contain corresponding fields for this esoteric parameter. This scenario provides but one example of dissimilarity between or among the fields of the various documents.

In another example, the contents of these fields as contained in different documents may be similar or dissimilar. As an example of content similarity, two documents may contain a color field that contains the textual contents "brown." As an example of content dissimilarity, the respective color fields might contain the textual contents "brown" and "dark beige."

FIG. 3 denotes at 310 those existing documents that pass the thresholding or filtering process and are output from the threshold comparison component. In the example shown in FIG. 3, the output documents 310 generally relate to sporting goods, as denoted at 104*m*, because the input document 302 relates also to sporting goods. The existing document 110*a*, pertaining to sporting goods 104*n*, may be included in the documents 310.

In some instances, the thresholding process may consider the categories of the items 104*n*, 106, and 108, as compared to the category of the new item 104*a*. Those documents corresponding to items that are in the same or similar categories as the new item 104*a* (e.g., 104*n*) may be more likely to pass the thresholding process shown in FIG. 3. On the other hand, the thresholding process may exclude some documents that relate to items in other categories (e.g., 106 and 108).

The threshold 308 may be set by trial or experimentation, whether by human personnel or by automated processes. Raising the threshold may result in fewer existing documents passing the threshold and being output at 310. Those output documents 310 may be more likely to include synonyms with the input document 302. Lowering the threshold may result in more existing documents passing the threshold and being output at 310, but these documents may include more "false positives," i.e., terms that may appear to be synonyms, but actually are not synonyms.

The thresholding process shown in FIG. 3 results in a set of existing documents 310 that are likely to contain synonyms with the input document 302. Additionally, the thresholding process enables recognition of terms appearing in the documents 302 and 310 that may be synonyms within a given context. For example, if the input document 302 relates to sporting goods, and threshold 308 is set high enough to admit only existing documents that relate to sporting goods, then any synonyms detected between these documents (as detailed below) may be recognized in the context of sporting goods.

Figure 4:
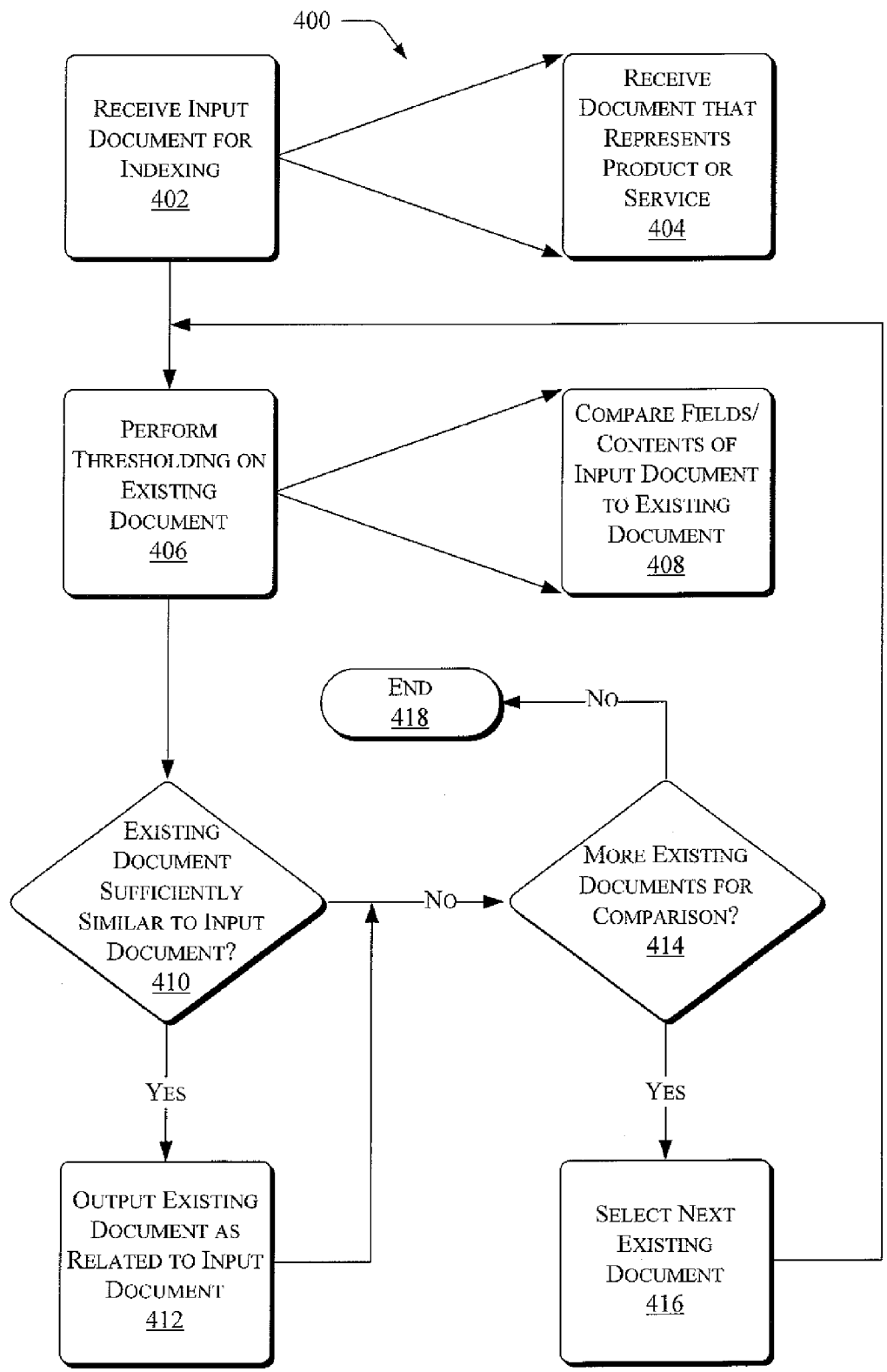
FIG. 4 is a flow diagram of a process for indexing the input document into the search index file.

Having described components and data flows related to indexing the input document into the search index file with FIG. 3, the discussion now turns to a description of a process for indexing the input document into the search index file, now presented with FIG. 4.

FIG. 4 illustrates a process 400 for indexing an input document into a search index file. More specifically, FIG. 4 illustrates a process for thresholding the input document while it is indexed. For convenience and conciseness of description, but not to limit possible implementations, the process 400 is described in connection with components shown in FIGS. 1-3 above. However, it is noted that at least portions of the process 400 may be performed with other components without departing from the spirit and scope of the description herein.

Block 402 represents receiving an input document (e.g., 302) for indexing into a search index file (e.g., 120). In some implementations, block 402 may include receiving input documents that relate to content posted at a website. In other implementations, the input document may relate to goods and/or services offered through a merchant website, as represented in block 404.

Block 406 represents thresholding an existing document, which is already indexed into the search index file, against the input document. Block 406 may include comparing fields and/or contents of the input document to the fields and/or contents of the existing document, as represented by block 408.

Block 410 represents evaluating whether the existing document is sufficiently similar to the input document that terms appearing in the two documents might be synonyms for one another. Block 410 may include performing a preliminary thresholding or filtering process, examples of which are described above with the threshold comparison component 306.

Continuing with decision block 410, if the existing document passes the threshold evaluation, then the process 400 may proceed to block 414, which represents outputting or identifying the existing document as passing the threshold for similarity to the input document. FIG. 3 shows examples of such output or identified documents at 310.

From block 410, if the existing document does not pass the threshold evaluation, then the process 400 may proceed to decision block 414. The process 400 may also reach decision block 414 after performing block 412. Decision block 414 represents testing whether the search index file contains any more existing documents to be thresholded against the input document. If not, the process 400 may proceed to an end state 418. However, if the search index file contains more existing documents, then the process 400 may proceed to block 416, which represents selecting a next existing document in the search index file for thresholding against the input document. Afterwards, the process 400 returns to block 406 to repeat the process with the newly-selected existing document.

Figure 5:
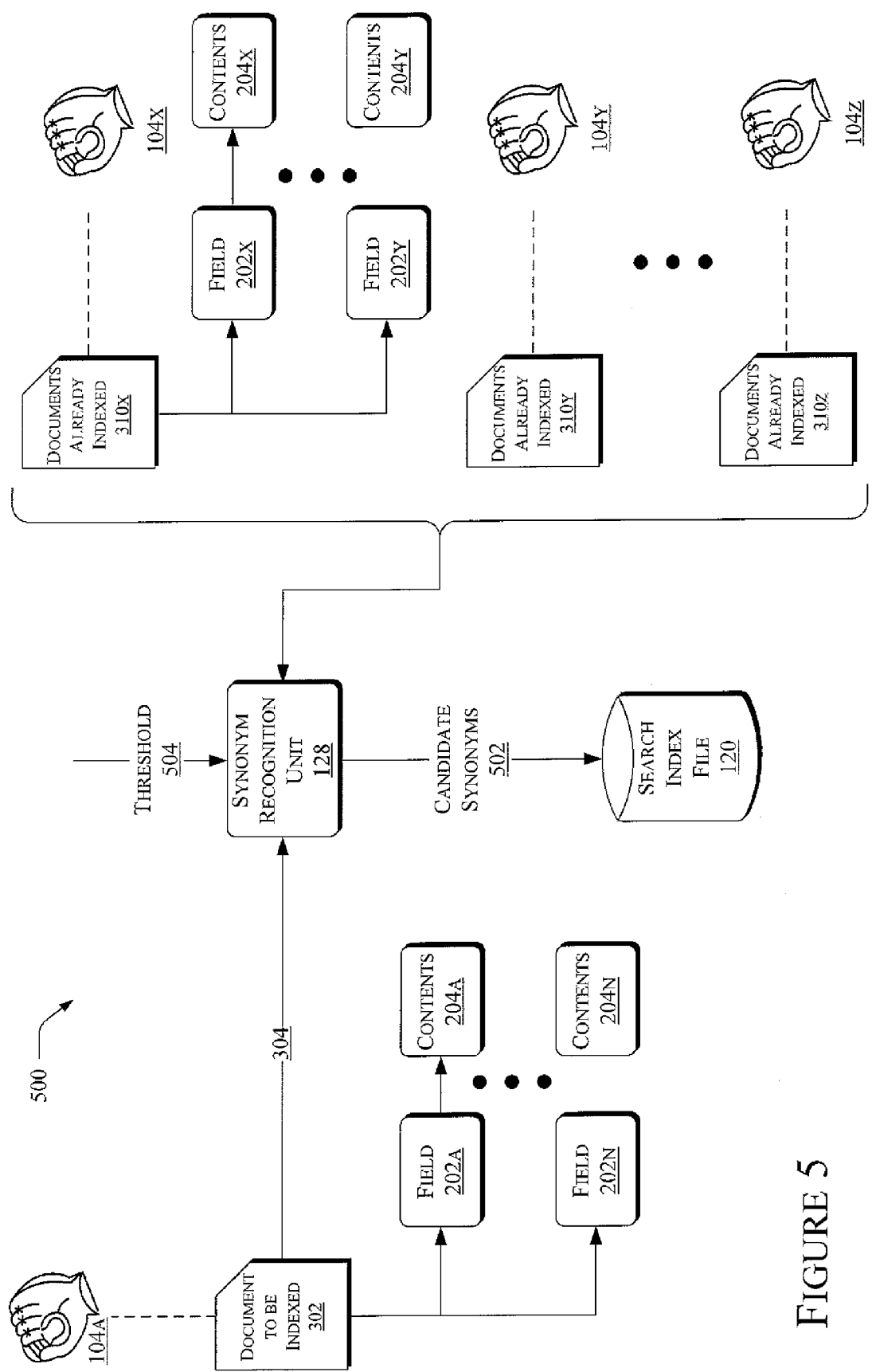
FIG. 5 is a block diagram of components and data flows for identifying candidate synonyms appearing in the input document.

Having described the process 400 for thresholding the input document while indexing it into the search index file with FIG. 4, the discussion now turns to a description of components and data flows related to identifying candidate synonyms appearing in the input document, now presented with FIG. 5.

FIG. 5 illustrates components and data flows 500 for identifying candidate synonyms appearing in an input document. For convenience and conciseness of description, but not to limit possible implementations, certain items described previously are carried forward into FIG. 5, and are denoted by the same reference numbers.

As shown in FIG. 5, the input document (e.g., 302) is input to the synonym recognition unit 128. As described previously, the input document may contain any number of fields (e.g., 202*a* and 202*n*) and contents (e.g., 204*a* and 204*n*).

The synonym recognition unit 128 then processes the fields and/or contents of the input document 302 against the existing documents that survived the preliminary thresholding process shown in FIGS. 3 and 4. Examples of such surviving documents are shown at 310*x*, 310*y*, and 310*z* (collectively, 310), but the documents 310 may include any number of individual documents. The surviving documents 310 may include fields (e.g., 202*x* and 202*y*) and/or contents (e.g., 204*x* and 204*y*).

Because the documents 310 survived the preliminary thresholding or filtering process shown in FIGS. 3 and 4, these documents may be expected to be fairly similar in structure and/or content to the input document 302. For example, assuming that the input document 302 relates to a baseball glove being offered through a merchant website, then any documents 310 that survive the preliminary thresholding process may be expected to relate specifically to other baseball gloves (e.g., the document 310*x* and item 104*x*). More generally, these documents 310 may be expected to relate to sporting goods (e.g., the documents 310*y* and 310*z* and items 104*y* and 104*z*).

In more detail, the synonym recognition unit 128 may identify candidate synonyms in the input document 302 by comparing fields and/or contents of that document to the fields and/or contents of the surviving documents 310. More specifically, the synonym recognition unit 128 may identify those portions of the surviving documents 310 that contain terms or phrases that are largely similar to terms or phrases that appear in the input document.

In some cases, there may be differences between terms or phrases appearing in analogous places in the input document and the surviving documents. For example, a field 202*a* in the input document 302 may be a description field that identifies the goods to which the input document relates. The contents 204*a* of this field 202*a* may include the text "baseball glove." Turning to the surviving documents 310, a field 202*x* in the surviving document 310*x* may also be a description field, with the related contents field 204*x* including the text "baseball mitt." In this example, the phrases "baseball glove" and "baseball mitt" exhibit some aspects of similarity and some aspects of dissimilarity. More specifically, the term "baseball" appears on both descriptions; however, the terms "glove" and "mitt" differ. As detailed further below, the synonym recognition unit 128 may infer that the terms "glove" and "mitt" are synonyms for one another in the context of sporting goods.

Generalizing from the above example, the synonym recognition unit 128 may recognize how much similarity and dissimilarity exists between the contents appearing in the input document and in a given surviving document. If some level of similarity exists between textual matter appearing in the two documents, then any dissimilar text may be synonyms. The synonym recognition unit may output any such dissimilar portions of the textual matter, as denoted generally as candidate synonyms 502. These candidate synonyms 502 may be processed into a data store, such as the search index file 120.

The synonym recognition unit 128 may employ a threshold 504 to specify how much of the textual matter appearing in the two documents is to be similar, before inferring that the dissimilar textual matter might be synonyms. Like the threshold 308 shown in FIG. 3, the threshold 504 may be set through trial and experimentation to yield optimal recognition of dissimilar textual matter as synonyms.

Figure 6:
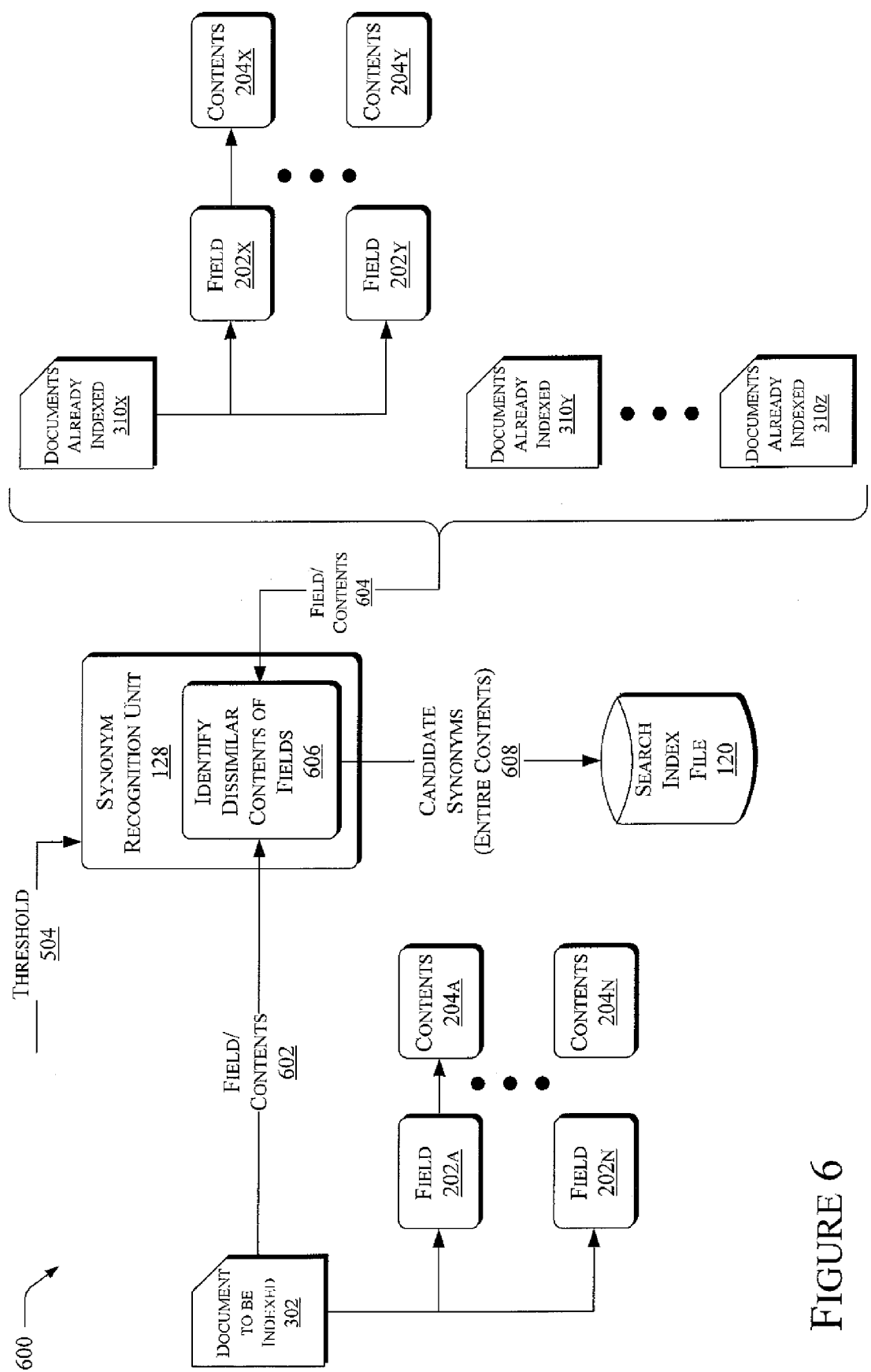
FIG. 6 is a block diagram of components and data flows for identifying candidate synonyms in a field of the input document.

Having described components and data flows 500 for identifying candidate synonyms appearing in an input document with FIG. 5, the discussion now turns to a more detailed description of components and data flows for identifying candidate synonyms in an entire field of the input document, now presented with FIG. 6.

FIG. 6 illustrates components and data flows 600 for identifying candidate synonyms in a field of the input document (e.g., 302). For convenience and conciseness of description, but not to limit possible implementations, certain items described previously are carried forward into FIG. 6, and denoted by the same reference numbers.

In the example shown in FIG. 6, the input document may contain any number of fields 202*a-n* and contents 204*a-n*. The synonym recognition unit 128 may receive these fields 202*a-n* and contents 204*a-n* as input, denoted generally at 602.

Turning to the existing documents 310*x-z*, and recalling previous discussion, the surviving or existing documents 310 may include fields 202*x-y* and contents 204*x-y*. The synonym recognition unit 128 may receive these fields 202*x-y* and contents 204*x-y* as input, denoted generally at 604.

The synonym recognition unit 128 may execute a process 606 that compares the input 602 to the input 604, and identifies dissimilar aspects of the input 602 that are dissimilar to corresponding aspects of the input 604. If enough of the fields 202 of the input document 302 and the surviving documents 310 have similar contents, then those fields that do not have similar contents might contain synonyms.

As example of the foregoing, assume that a plurality of fields 202*a* and contents 204*a* in the input document 302 contain similar information as a corresponding plurality of fields 202*x* and contents 204*x* in the existing document 310*x*. However, assume that the field 202*n* in the input document corresponds to the field 202*y* in the existing document 310*x*, but that the related contents 204*n* are different than the related contents 204*y*. For example, the fields 202*n* and 202*y* may be color fields, and the contents 204*n* and 204*y* may specify the color of the goods to which the documents 302 and 310*x* apply (e.g., a baseball glove, shoe, or the like). The contents 204*n* may include the text "brown", while the contents 204*y* may include the text "dark beige."

If the rest of the fields of the documents 302 and 310*x* are sufficiently similar to one another, then the process 606 may infer that these two documents relate to similar goods. For example, assume that the documents 302 and 310*x* each include four fields that are common between the two documents (e.g., a brand field, a manufacturer field, an item description field, and a SKU/UPC field), and that contain similar or identical contents. Assume further that the documents 302 and 310*x* both contain a fifth field that is also common between the two documents (e.g., a color field), but contains dissimilar contents (e.g., "brown" versus "dark beige"). In light of the preponderance of similar fields and field contents between the two documents 302 and 310*x*, the process 606 may infer that these two documents relate to similar goods. It is noted that any percentage of similar fields may be suitable in different implementations, depending on experimentation, iteration, and past or projected results. Thus, the foregoing scenario is provided only for example, but does not limit possible implementations.

Having made this inference, the process 606 may also infer that the remaining, dissimilar fields contain candidate synonyms. Returning to the example of differing colors, if enough fields are similar between two documents, then the process 606 may infer that the two documents relate to similar (perhaps identical) goods. Thus, the process 606 may infer that the colors specified in those two documents, while dissimilar, are nevertheless synonyms for one another. Thus, the process 606 may infer that "brown" and "dark beige" are synonyms, and may report these colors as candidate synonyms 608.

In the example given in FIG. 6, the candidate synonyms 608 are expressed as synonyms that include the contents 204 considered as a whole. However, the foregoing description is equally applicable to considering the contents 204 considered as individual sub-portions. This latter scenario is detailed further below in FIGS. 8 and 9.

The synonym recognition unit 128 or, more specifically, the process 606 may be responsive to the threshold signal 504. This threshold signal may indicate how many of the fields are to be similar before inferring that any differing fields are candidate synonyms.

The candidate synonyms 608 may be processed into a data store, such as the search index file 120 described above. As described further below, these candidate synonyms may enable optimized searching operations.

Figure 7:
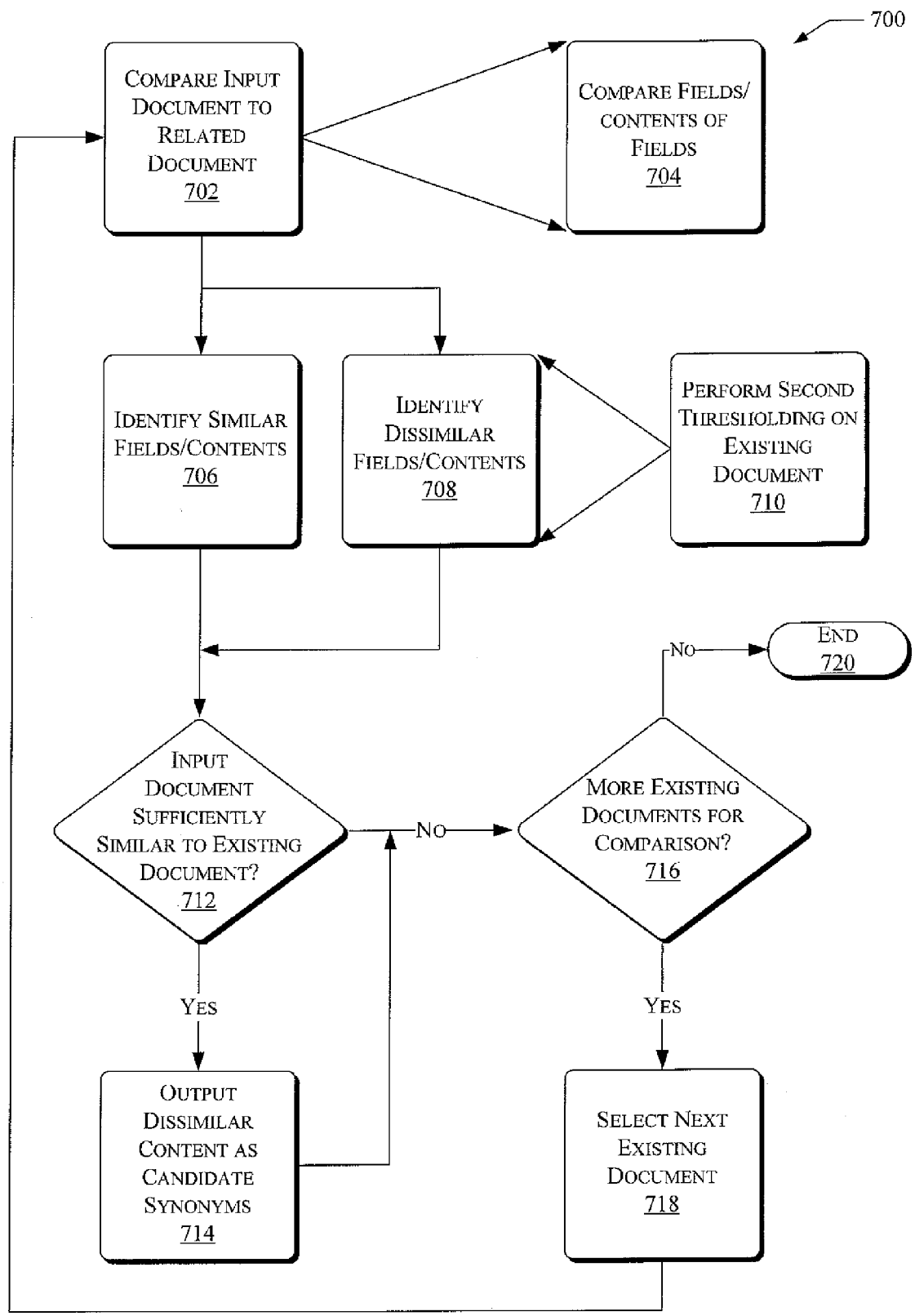
FIG. 7 is a flow diagram of a process for identifying candidate synonyms in the fields of the input document.

Having described components and data flows 600 for identifying candidate synonyms in a field of the input document with FIG. 6, the discussion now turns to a description of a process for identifying candidate synonyms in a field of the input document, now presented with FIG. 7.

FIG. 7 illustrates a process 700 for identifying candidate synonyms in a field of the input document. For convenience and conciseness of description, but not to limit possible implementations, the process 700 is described in connection with components shown in FIGS. 1-6 above, for example the synonym recognition unit 128 and the process 606, as shown in FIG. 6. However, it is noted that at least portions of the process 700 may be performed with other components without departing from the spirit and scope of the description herein.

Block 702 represents comparing an input document (e.g., 302) to a given output document that has survived a preliminary thresholding process, such as the thresholding described in FIGS. 3 and 4 above. FIG. 6 shows examples of such output documents at 310.

Block 702 may include comparing respective fields of the input document and the output document, as represented by block 704. Examples of such respective fields that may be compared are shown at 202a and 202x in FIG. 6. Block 704 may also include comparing respective contents of particular fields. FIG. 6 shows examples of such respective contents at 204a and 204x.

Block 706 represents identifying fields and/or contents of fields that are similar between the compared documents. In parallel or in serial with block 706, block 708 represents identifying any fields and/or contents of fields that are dissimilar between the compared documents. Taken together, blocks 706 and 708 may be considered as implementing a second thresholding on the existing document, as represented by block 710. The previous thresholding operation is represented by, for example, block 306 in FIG. 3.

Decision block 712 represents evaluating whether the amount of similar content found between the compared documents is sufficient to justify or support an inference that any dissimilar content between the compared documents are candidate synonyms. Block 712 may include using a threshold signal (e.g., 504 in FIG. 6). If the amount of similar content is sufficient to justify the inference, the process 700 may proceed to block 714, which represents outputting or identifying any dissimilar content between the compared documents as candidate synonyms. FIG. 6 shows an example of such candidate synonyms at 608, and describes an example scenario in which the color fields for compared documents include the respective text strings "brown" and "dark beige."

From decision block 712, if the amount of similar content is not sufficient to justify the inference, then the process 700 may proceed to decision block 716. The process 700 may also reach decision block 716 after performing block 714.

Decision block 716 represents evaluating whether additional documents remain for comparison to the input document. If so, the process 700 may proceed to block 718, which represents selecting another existing document for comparison to the input document. The process 700 then returns to block 702, to repeat the process with the newly-selected existing document.

From decision block 720, if no additional documents remain for comparison to the input document, the process 700 may proceed to end state 720. The process 700 may wait in state 720 for the arrival of another input document for processing.

Figure 8:
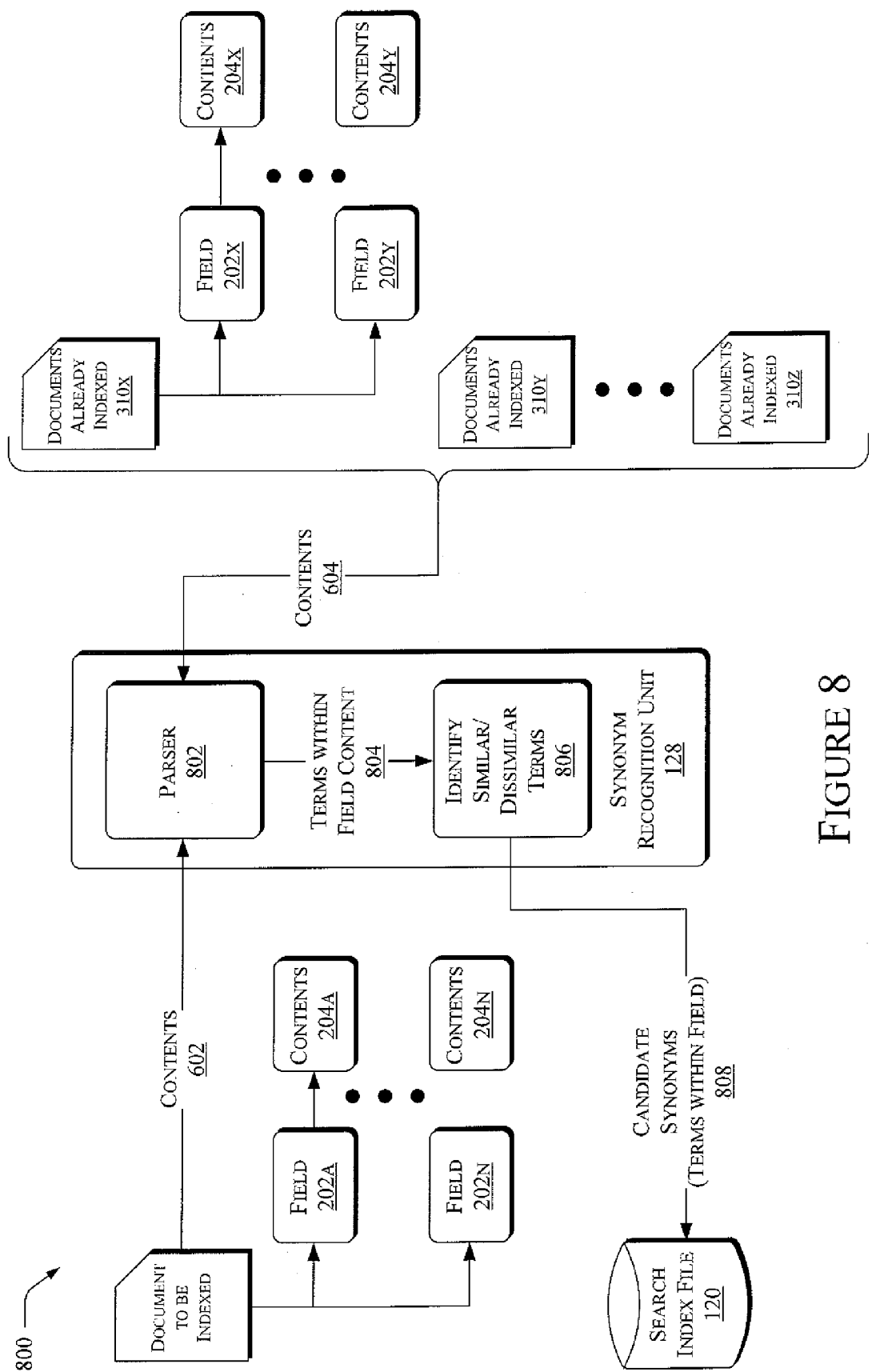
FIG. 8 is a block diagram of components and data flows for identifying synonyms within portions of the fields of the input document.

Having described the process 700 for identifying candidate synonyms in an entire field of the input document with FIG. 7, the discussion now turns to a description of components and data flows related to identifying synonyms within portions of the fields of the input document, now presented with FIG. 8.

FIG. 8 illustrates components and data flows 800 for identifying synonyms within portions of the fields of the input document 302. For convenience and conciseness of description, but not to limit possible implementations, certain items described previously are carried forward into FIG. 8, and denoted by the same reference numbers.

FIG. 8 denotes the contents of the input document as input to the synonym recognition unit 128 at 602. The input 602 may include fields (e.g., 202a-n) and/or contents of those fields (e.g., 204a-n). Turning to the documents already indexed into the search index file 120 and being compared to the input document, the contents of these existing documents as input to the synonym recognition unit are denoted at 604. The input 604 may include fields (e.g., 202x-y) and/or contents of those fields (e.g., 204x-y).

The synonym recognition unit 128 may include a parser 802, which parses the inputs 602 and 604 into terms that appear within the field content, denoted generally at 804. For example, returning to the "baseball glove"-"baseball mitt" example described above, assume that the field 204a in the input document 302 contains the text "baseball glove," and the field 204x in the existing document 310x contains the text "baseball mitt." The parser 802 may process the text "baseball glove" from the input document 302 into the individual terms "baseball" and "glove," and may process the text "baseball glove" from the existing document 310x into the individual terms "baseball" and "mitt."

The synonym recognition unit 128 may also include a process 806 that received as input the parsed terms 804. The process 806 may identify similar and/or dissimilar portions of the individual terms 804, and output those terms that are dissimilar as candidate synonyms. The output candidate synonyms are denoted generally at 808. Returning to the example in which the input 602 includes the text "baseball glove", and the input 604 includes the text "baseball mitt", the identification process 806 may correlate the terms "baseball" appearing in both input text strings, but then recognize that the term "mitt" differs from "glove". In this event, the identification process 806 may output the terms "mitt" and "glove" as candidate synonyms 808.

Having described the components and data flows 800 for identifying synonyms within portions of the fields of the input document 302 with FIG. 8, the discussion now turns to a description of a process for identifying synonyms within portions of the fields of the input document, now presented with Figure.

Figure 9:
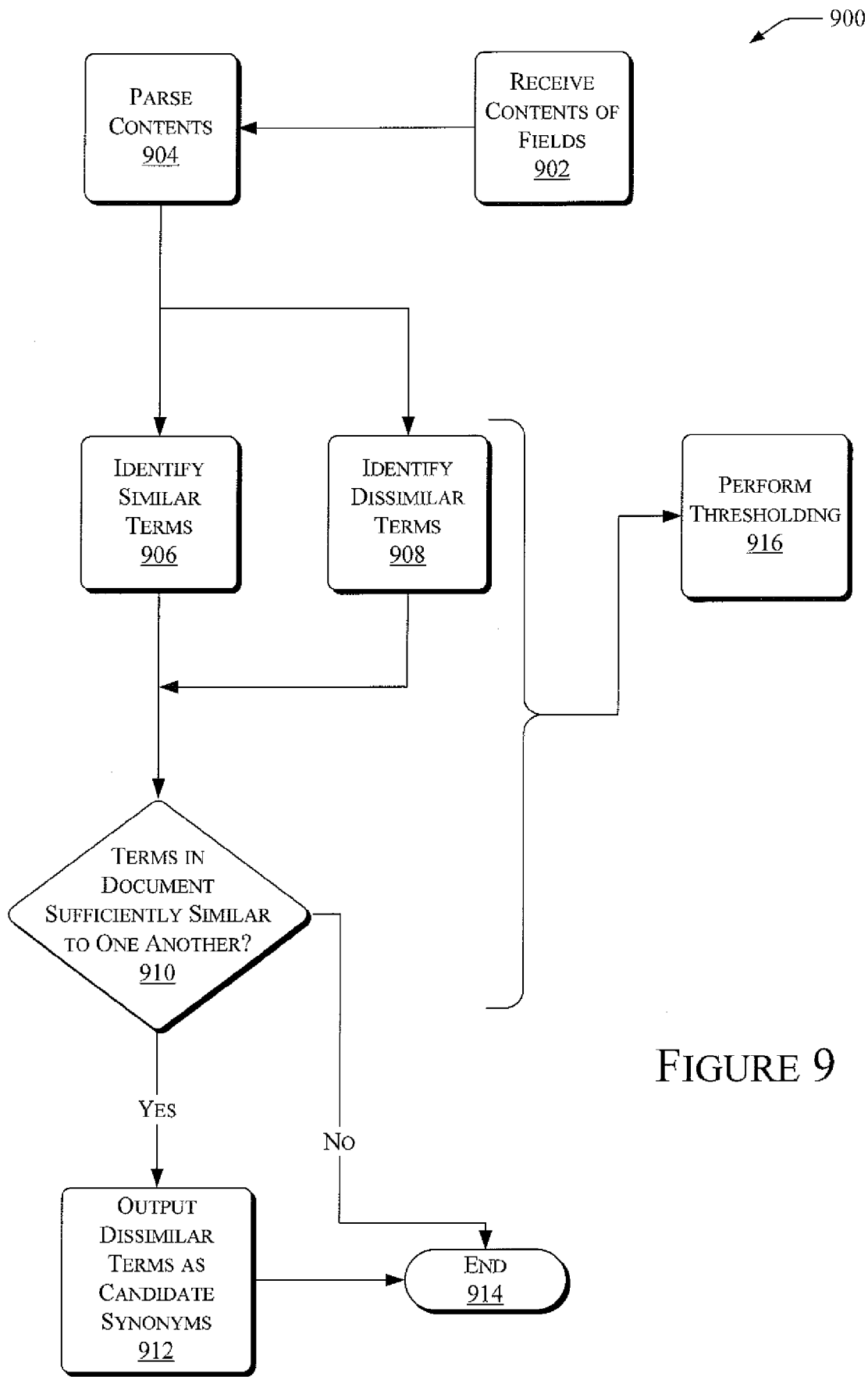
FIG. 9 is a flow diagram of a process for identifying synonyms within portions of the fields of the input document.

FIG. 9 illustrates a process 900 for identifying synonyms within portions of the fields of the input document. For convenience and conciseness of description, but not to limit possible implementations, the process 900 is described in connection with components shown in FIGS. 1-8 above, for example the synonym recognition unit 128 and the relates sub-processes 802 and 806, as shown in FIG. 8. However, it is noted that at least portions of the process 900 may be performed with other components without departing from the spirit and scope of the description herein.

Block 902 represents receiving contents of fields from an input document (e.g., 302) that is to be indexed into, for example, a search index file (e.g., 120). Block 902 may also include receiving contents of fields from at least one existing document that is already indexed into the search index file (e.g., 310x-z).

Block 904 represents parsing textual contents of the input fields as received in block 902. Block 904 may be performed by a parser (e.g., 802), and may include processing an input textual phrase into its individual constituent terms. For example, block 904 may include parsing the phrase "baseball glove" into the terms "baseball" and "glove."

Block 906 represents identifying any similar terms appearing in the inputs as received from the input document and the existing document. Block 906 may include comparing the terms as received from a parsing process, and locating any terms that appear in both documents. In parallel or serially with block 906, block 908 represents identifying any dissimilar terms appearing in the documents. Continuing the previous example, block 906 may include identifying the term "baseball" as appearing in both of the phrases "baseball glove" and "baseball mitt," while block 908 may include identifying the terms "glove" and "mitt" as being dissimilar.

Having identified any similar and/or dissimilar terms appearing in the two input phrases, decision block 910 represents evaluating whether the two input phrases exhibit enough similarity to justify inferring that any dissimilar terms are probably synonyms. For example, returning to the "baseball glove-baseball mitt" example above, these two phrases each contain two terms, with one term ("baseball") occurring in both phrases. In this particular example, this one common term may be sufficient to justify inferring that the dissimilar terms ("glove" and "mitt") are candidate synonyms.

It is noted that any percentage of similar terms appearing within phrases may be suitable in different implementations, depending on experimentation, iteration, and past or projected results. Thus, the foregoing scenario is provided only for example, but does not limit possible implementations.

Returning to decision block 910, If the two input phrases exhibit sufficient similarity, the process 900 may proceed to block 912, which represents outputting the dissimilar portions of the input phrases as candidate synonyms (e.g., 808). Afterwards, the process 900 may reach end state 914, to await the next iteration of the process 900.

Returning to decision block 910, if the two input phrases do not exhibit enough similarity to justify inferring that any dissimilar terms are probably synonyms, then the process 900 may proceed directly to end state 914.

The blocks 906, 908, and 910 may be viewed as applying a thresholding operation to the terms that make up the content received in block 902. FIG. 9 generally represents this thresholding operation as by block 916.

Having described the process 900 for identifying synonyms within portions of the fields of the input document with FIG. 9, the discussion now turns to additional techniques for identifying synonyms within documents. More specifically, some implementations of this description may analyze visitor behavior or activity to identify a set of dissimilar items that may nevertheless exhibit some level of similarity. FIGS. 10-13 illustrate various aspects of these implementations. These Figures are now described in detail, before turning to a description of merging detected candidate synonyms into the search index file beginning with FIG. 14.

Figure 10:
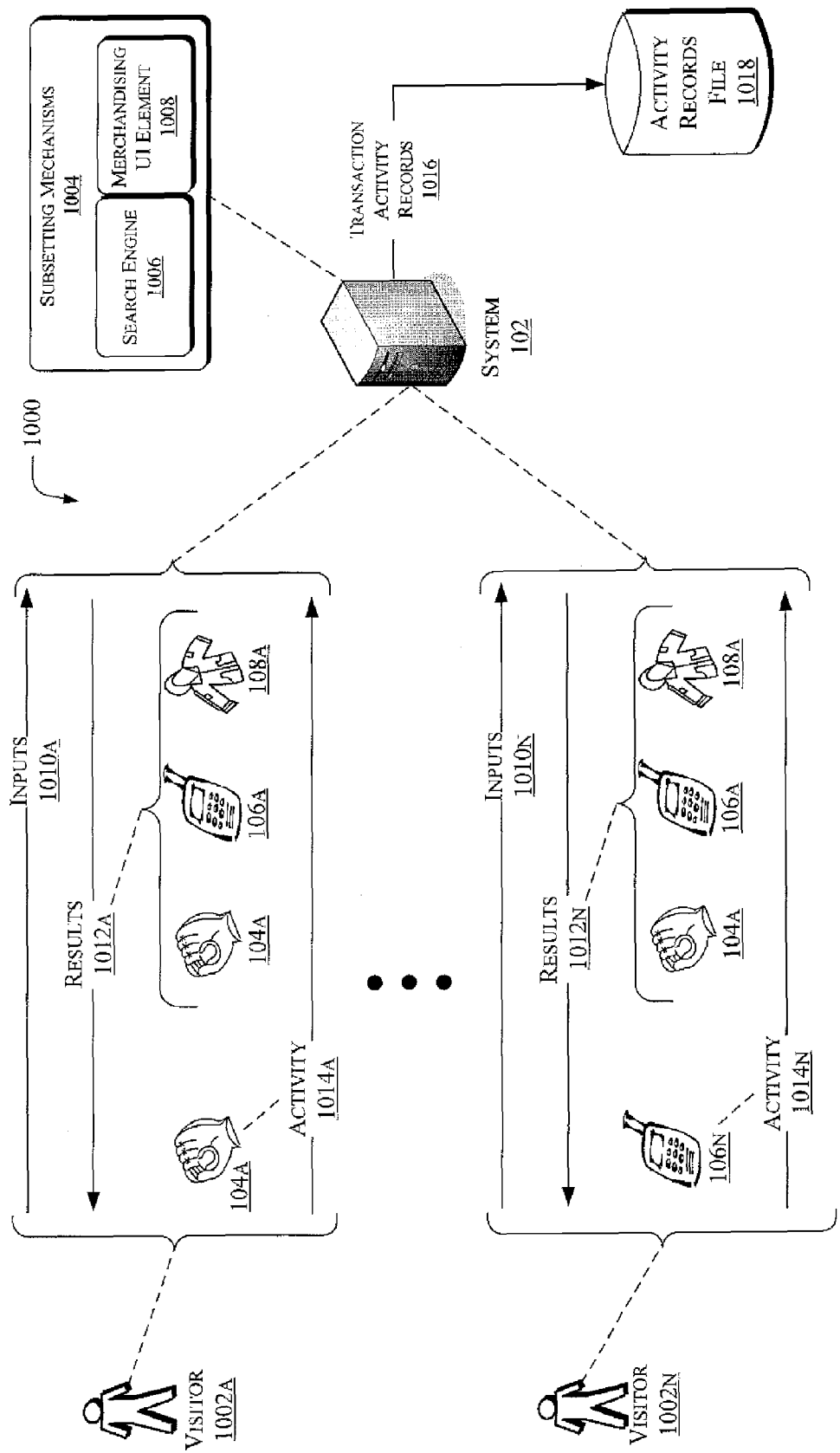
FIG. 10 is a combined block and data flow diagram illustrating examples of transactions involving visitors, where these transactions result in activity records that may provide an additional basis for recognizing synonyms.

FIG. 10 illustrates examples of operating environments, denoted generally at 1000, that support transactions involving visitors, where these transactions result in activity records that may provide additional bases for recognizing synonyms. For convenience and conciseness of description, but not to limit possible implementations, some elements described previously are carried forward into FIG. 10, and denoted by the same or similar reference numbers.

One or more visitors 1002 to a network-accessible resource (e.g., a website) may interact with one or more servers or systems 102 that host the resource. FIG. 10 provides two examples of such visitors, denoted at 1002a and 1002n, but the operating environments 1000 may support any number of visitors.

The system 102 may serve as a gateway that enables the visitors to access information about a set of items. This set of items may be referred to as a "catalog" of items. The system 102 may provide different mechanisms by which visitors may extract a relevant subset of these items for detailed review and consideration. FIG. 10 denotes these subsetting mechanisms generally at 1004. One example of such a subsetting mechanism is a search engine component 1006. As described further below, the search engine 1006 may receive search terms from the visitors, and provide search results responsive to these search terms.

Another example subsetting mechanism is a merchandising user interface (UI) element 1008, which may conduct a dialog with the visitor to establish a particular context of interest to the visitor. For example, if the visitor is searching for a gift for an intended recipient, the merchandising element 1008 may collect information about the recipient, and based on this information, may recommend a set of one or more items as candidate gifts to the visitor. Thus, in the given context of recommending a gift for this recipient, the merchandising element may extract a subset of items that are relevant to this context. As another example, the merchandising element may recommend particular colors for particular items, or may recommend colors for a given item that match or coordinate with one or more other items. In this manner, the merchandising element may serve as an intermediary between the visitors and various components of the system 102 (e.g., the search engine 1006)

The visitors may provide inputs to the subsetting mechanisms 1004. If the visitor is interacting with the search engine 1006, these inputs may include one or more search terms submitted to the search engine. If the visitor is interacting with a merchandising element, these inputs may include specifications or criteria that the visitor provides to the merchandising element. These specifications or criteria may enable the merchandising element to set an appropriate subsetting or searching context for the visitor.

Turning first to the visitor 1002a, this visitor may provide one or more inputs to the system, with these inputs denoted at 1010a. Examples of these inputs may include search terms provided to a search engine, and/or may include specifications or criteria suitable for setting a search context. The visitor may provide these inputs to locate items for potential purchase or acquisition, for example.

The system 102 may receive these inputs 1010a and generate corresponding results 1012a. These results 1012a may include representations of one or more items, with FIG. 10 carrying forward three examples of such items at 104a, 106a, and 108a. These items result from keyword searches performed by a search engine (e.g., 1006), or may result from a search context set by a merchandising UI element (e.g., 1008). These items may exhibit some level of dissimilarity, with the examples shown in FIG. 10 chosen only to illustrate this dissimilarity, but not to limit possible implementations. The representations of these items may include textual representations, verbalized descriptions, graphical representations or icons, or any suitable combination of these examples.

The visitor 1002a may then review the representations included in the results 1006a. If any of these search results interest the visitor, then he or she may perform some activity related to the search results of interest, with FIG. 10 denoted these activities at 1014a. In the example shown in FIG. 10, the visitor 1002a has selected the item represented at 104a. Examples of such activities may include placing a representation of an item into an electronic shopping cart, selecting the item for some further research or review, placing the item into a "wish list" or other similar structure for later review and access, browsing additional information related to the item, or the like.

The system 102 may store one or more transaction activity records 1016 that indicate a sequence of inputs and responses involving the visitor and the system. The system may store these transaction activity records in, for example, an activity records file 1018.

Turning to the visitor 1002n, this visitor may interact with the system 102 similarly to the visitor 1002a. For example, the visitor 1002n may provide inputs 1010n to the system, and receive results 1012n in response. In the example shown in FIG. 10, the inputs 1010n may be the same as the inputs 1010a that were provided by the visitor 1002a, and that the results 1012n may be the same or similar to the results 1012a. For ease of reference, FIG. 10 denotes the items included in the results 1012n at 104n, 106n, and 108n.

In the example shown in FIG. 10, assume that the visitor 1002n selects the item 106n for further activity, rather than the item 104a as chosen by the visitor 1002n. In this example, the same inputs provided by different visitors resulted in the same or similar results, but faced with these same results, the two visitors selected different items for subsequent activity. This scenario may support an inference that the two different items selected under these circumstances may be similar enough to one another that some synonyms may exist between them. The strength of this inference may depend on how similar the activities were that lead to their selection by the different visitors. For example, these two or more items may be associated with descriptive documents (e.g., the documents 110, 112, and 114 in FIG. 1), and these documents may be flagged for synonym analysis if their associated items are selected by different visitors under the conditions illustrated in FIG. 10.

The system may also store transaction history records 1016 related to interactions involving the visitor 1002n, or any other visitors who interact with the system 102. Having described the example transactions involving the visitors in FIG. 10, the discussion now proceeds to a description of example records and contents of the activity records file, as shown in FIG. 11 and now described.

Figure 11:
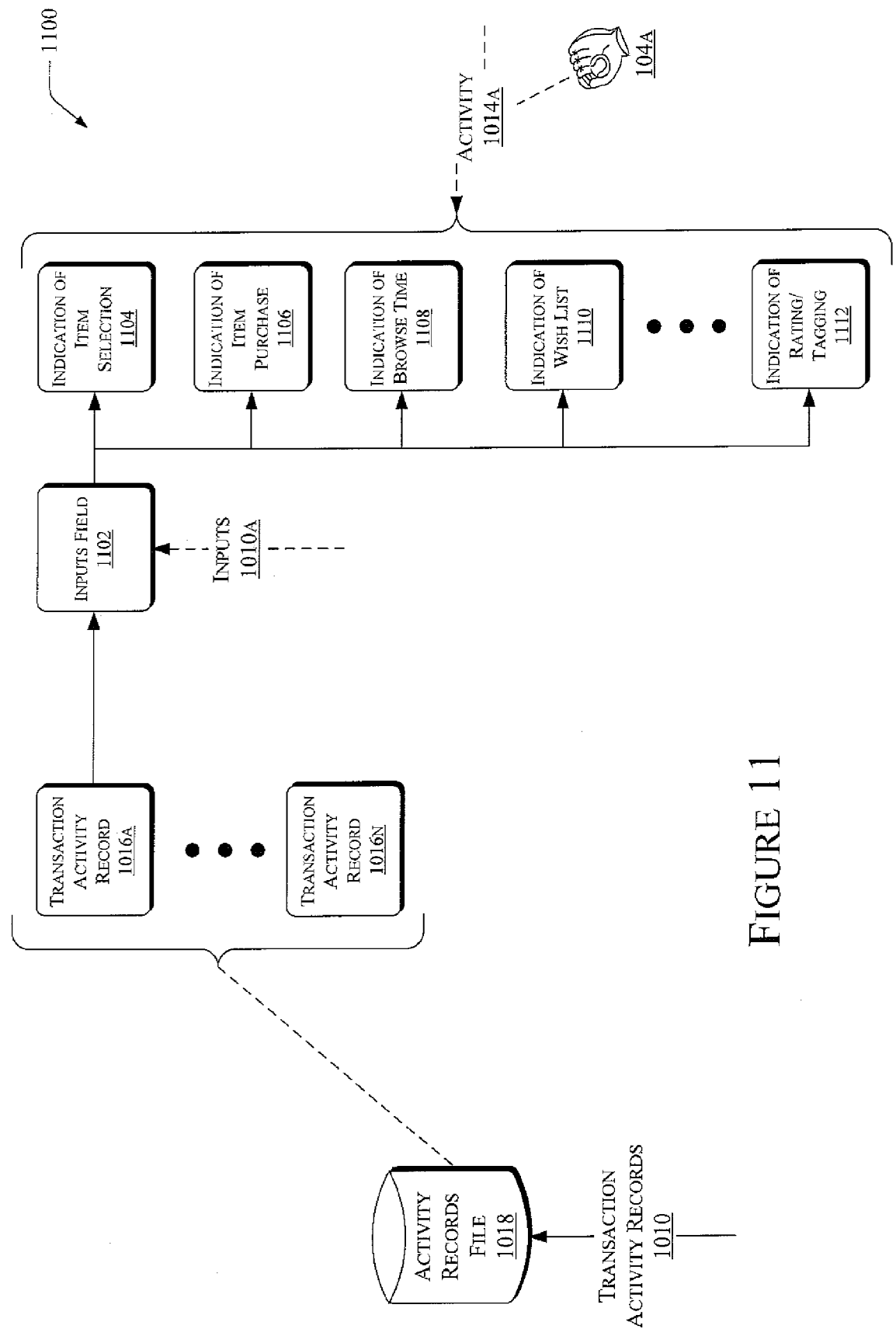
FIG. 11 is a block diagram illustrating example records and contents of a click stream file that may store the activity records shown in FIG. 3.

FIG. 11 illustrates example records and contents, denoted generally at 1100, of the activity records file as shown in FIG. 10. For convenience and conciseness of description, but not to limit possible implementations, some elements described previously are carried forward into FIG. 11, and denoted by the same or similar reference numbers.

The activity records file 1012 may receive and store one or more instances of transaction activity records, denoted collectively at 1016. FIG. 11 provides two examples of these records, denoted at 1016a and 1016n. The record 1016a may pertain to the interaction between the visitor 1002a and the system 102, while the record 1016n may pertain to the interaction between the visitor 1002n and the system 102.

Turning to the record 1016a as an example, the records 1016 may contain an inputs field 1102 that indicates what inputs the visitor entered to initiate a given transaction. As described above, these inputs may include search terms provided to a search engine, or specifications or criteria provided to a merchandising UI element (e.g., 1008). In the example shown in FIG. 11, the search term field 1102 may contain data representing the inputs 1010a.

The search term field 1102 may be associated with one or more fields, with FIG. 11 providing several non-limiting examples of such fields. For example a field 1104 may store an indication of an item that the visitor selected for further activity, after having provided the search term stored in the field 1102. Examples of such activity may include further viewing of information related to the item, placement of a representation of the item in a shopping cart, browsing of reviews or comments relating to the item, or the like.

A field 1106 may store an indication of an item that the visitor selected and purchased, after having provided the search term stored in the field 1102. A field 1108 may store an indication of how long a visitor browsed information related to a given item, after having provided the search term stored in the field 1102. A field 1110 may store an indication of an item that the visitor placed on a wish list or other similar structure, after having provided the search term stored in the field 1102. A field 1112 may store an indication of any ratings or tagging actions performed by the visitor on a given item.

The fields 1104-1110 provide various examples of the activity 1008a that the visitor 1002a may perform after entering the search term 1004a. However, in providing these examples of such activity, it is noted that other types of activity are possible without departing from the scope and spirit of the description herein. Additionally, implementations of the description herein may populate one or more of the example fields 1104-1110, but need not populate all of these fields in every instance. In the example shown in FIG. 11, the activity may relate to the item 104a selected by the visitor 1002a.

Turning to the record 1010n, this record may store information relating to the interaction between the visitor 1002n, and the item 106n selected by the visitor. However, in the interests of clarity, FIG. 11 omits the fields of the record 1010n, but it is understood that the description of the fields 1102-1110 would apply equally to these fields.

Figure 12:
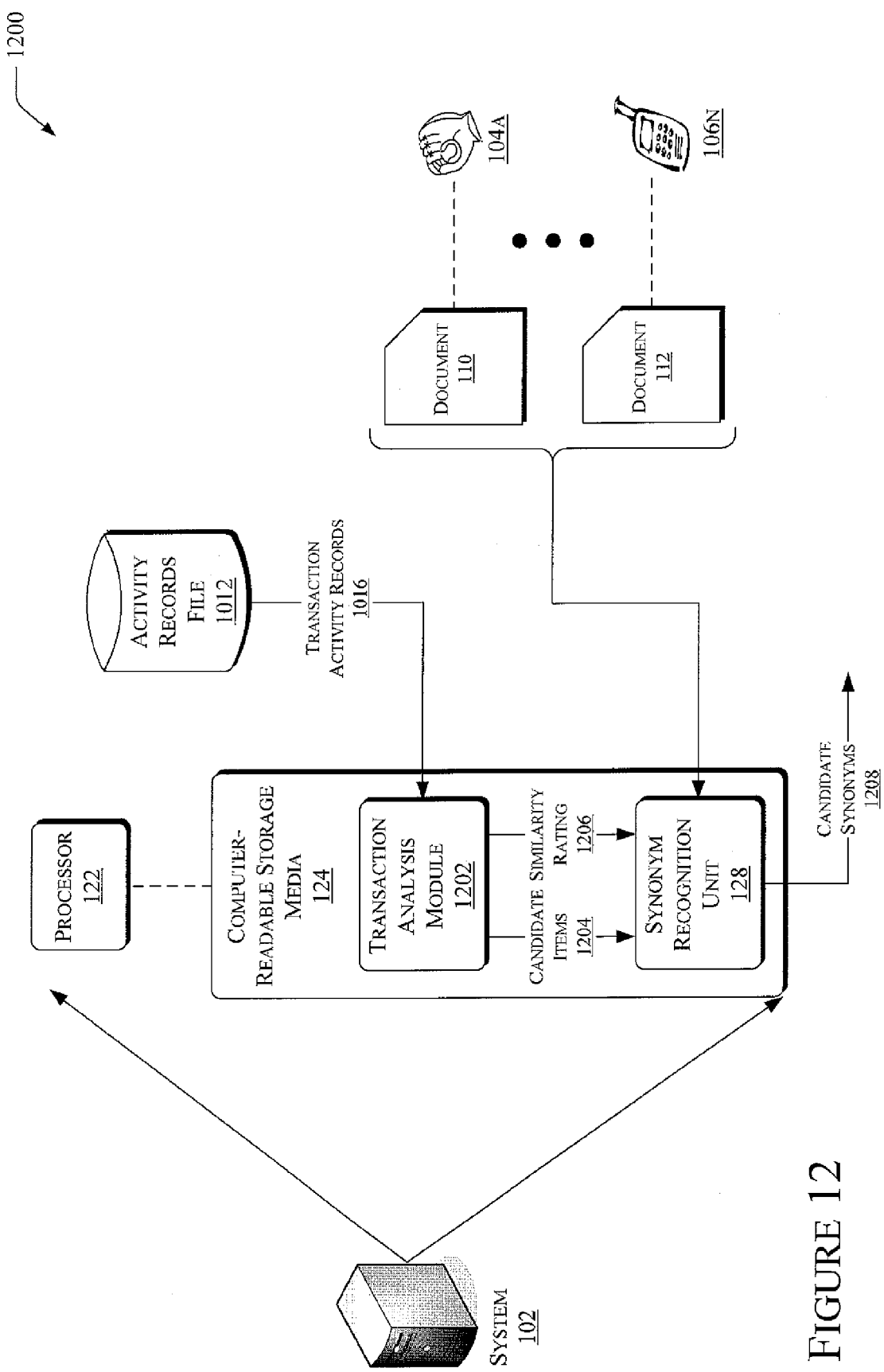
FIG. 12 is a combined block and data flow diagram illustrating components of a system, as augmented to process the activity records to identify common search terms that lead to activity involving different items.

Having described the fields and contents of the activity records file in FIG. 11, the discussion now proceeds to a description of components of a system (e.g., 102) for processing the activity records stored in the activity records file, now presented in FIG. 12.

FIG. 12 illustrates components, denoted generally at 1200, of a system for processing the activity records stored in an activity records file. For convenience and conciseness of description, but not to limit possible implementations, some elements described previously are carried forward into FIG. 12, and denoted by the same or similar reference numbers.

The system 102 is carried forward from previous drawings, and may include one or more processors and one or more instances of computer-readable storage media. FIG. 12 carries forward an example of a processor 122 and a computer-readable medium 124. The computer-readable medium 124 may include a transaction analysis module 1202 that retrieves transaction activity records (e.g., 1010) from an activity records file (e.g., 1012), and processes these records to identify any dissimilar items that were selected for activity by visitors after the visitors submitted similar search terms. As described above, because these dissimilar items were selected by different visitors after the visitors searched using the same search terms, these dissimilar items may exhibit some level of similarity. Further, any descriptive materials associated with the items (e.g., documents 110 and 112) may contain useful synonyms. The transaction analysis module 1202 may output indications of these dissimilar items as candidate items 1204.

The transaction analysis module 1202 may also define and output a similarity signal 1206. For example, if the transaction analysis module 1202 detects two dissimilar candidate items 1204, then these two candidate items may be associated with respective instances of activity or behavior history that led to the selections of the items by the visitors. The transaction analysis module 1202 may score these instances of activity or behavior to indicate whether the activity positively or negatively correlates the input provided by the visitor to the item selected by the visitor.

As examples of this scoring process, if the visitor provides a search term and afterwards purchases a given item represented in the results, this behavior may strongly correlate the search term with the given item. However, if another visitor provides the same search term, afterwards reviews another item different than the given item, but does not purchase this other item, then this behavior may negatively correlate the search term with the different item. The signal 1206 may indicate this negative or positive correlation, and may modify or augment a similarity rating of items that resulted from textual analysis of documents related to the items (e.g., 110 and 112).

FIG. 12 carries forward the synonym recognition unit 128, which may function as described above. In addition, however, the synonym recognition unit may receive the indications of the candidate items 1204, retrieve any documentation associated with these items, and process this documentation for any synonyms occurring therein.

In the example shown in FIG. 12, the indication 1204 from the transaction analysis module suggests that the dissimilar items 104a and 106n may nevertheless share synonyms, because the visitors selected these items after searching for the same search terms. The item 104a may be associated with descriptive material contained in a document 110, while the item 106n may be associated with descriptive material contained in a document 112. The synonym recognition unit may receive these documents 110 and 112 as input, and process them as described above to identify any candidate synonyms appearing therein. FIG. 12 denotes these candidate synonyms at 1208.

The synonym recognition unit may also receive the signal 1206 that represents a similarity rating of the candidate items. The synonym recognition unit may consider any similarity in the respective activity or behavior histories of the candidate items 1204. For example, if respective visitors purchased two or more candidate items after the visitors performed similar activities, this may indicate that the candidate items are stronger candidates for synonym analysis. However, if the respective visitors purchased two or more candidate items after the visitors performed dissimilar activities, this may indicate that the candidate items are weaker candidates for synonym analysis. As described above, this activity analysis may modify any textual analysis of documents related to the items (e.g., 110 and 112).

Figure 13:
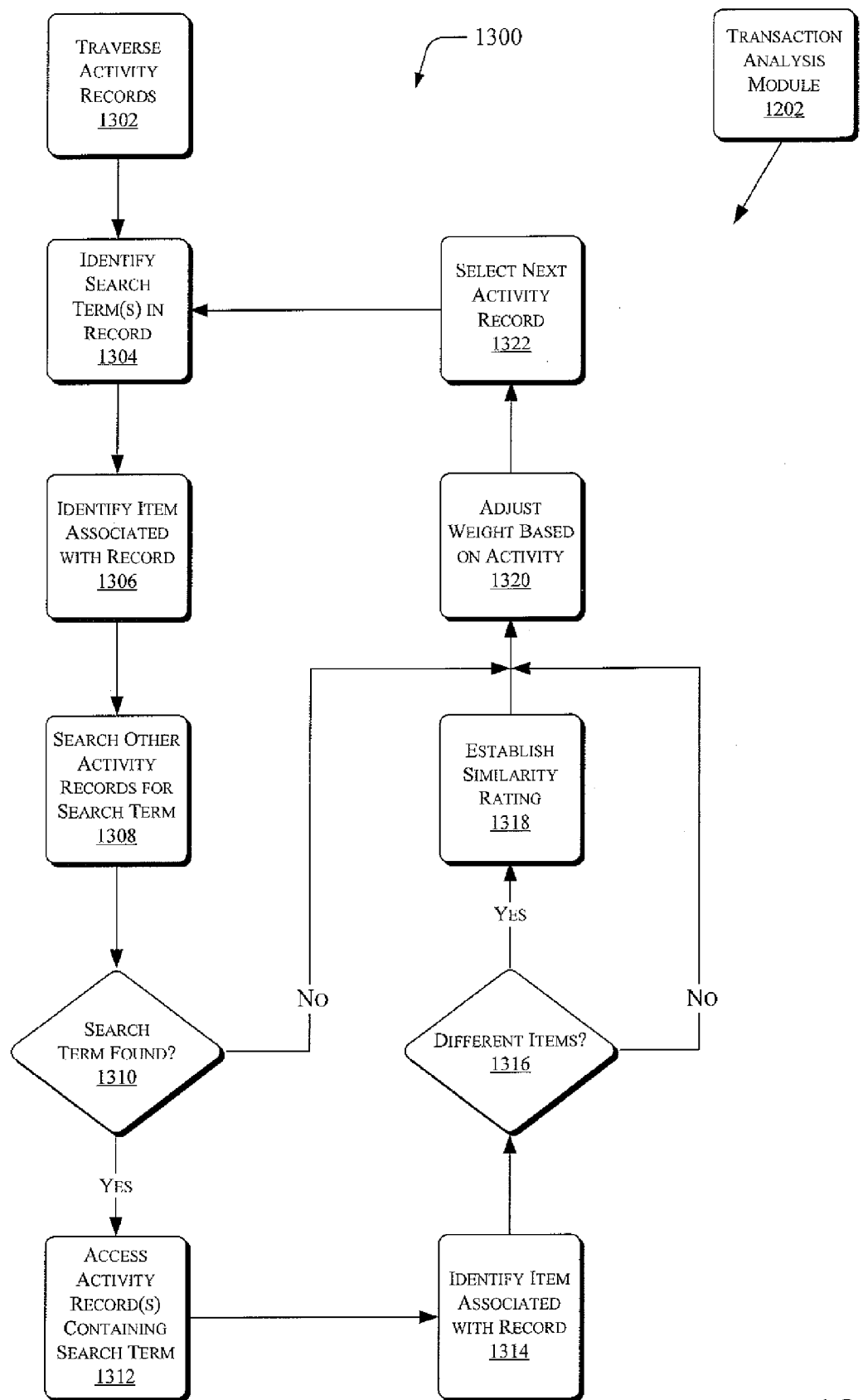
FIG. 13 is a flow diagram illustrating processes for analyzing transactions to identify the common search terms and the different items shown in FIG. 5.

Having described the components of a system for processing the activity records stored in an activity records file, the discussion now proceeds to a description of processes for analyzing transactions to identify different items that resulted from the same search terms and that were selected for activity by different visitors, now presented with FIG. 13.

FIG. 13 illustrates processes, denoted generally at 1300, for analyzing records of transactions to identify different items that resulted from the same search terms and that were selected for activity by different visitors. For convenience and conciseness of description, but not to limit possible implementations, some elements described previously are carried forward into FIG. 13, and denoted by the same or similar reference numbers. For example, FIG. 13 carries forward the transaction analysis module 1202 to indicate that the module may perform the process flows shown in FIG. 13. However, this example implementation is non-limiting, and it is noted that components other than the transaction analysis module 1202 may perform some or all of these process flows without departing from the scope of the description herein.

Block 1302 represents traversing an activity records file (e.g., 1012), and retrieving from this file one or more activity records. FIG. 10 shows examples of such activity records at 1010. Block 1302 may include pulling these activity records in any appropriate sequence. Additionally, FIG. 13 omits any tests for end-of-file or end-of-record conditions in the interests of clarity and conciseness.

Block 1304 represents identifying any search terms associated with an activity record currently under analysis. FIG. 10 provides examples of search terms at 1004a and 1004n. Block 1304 may include accessing the contents of a search term field (e.g., 1102 in FIG. 11).

Block 1306 represents identifying any items that are associated with activity stored in the instant activity record. FIG. 10 provides examples of these activities at 1008a and 1008n, and provides examples of related items at 104a and 106n. Block 1306 may include accessing the contents of various fields that may store indications of such activity, with FIG. 11 providing examples of such fields at 1104-1110.

Block 1308 represents traversing the activity records file (e.g., 1012) to locate any other activity records that are keyed or indexed by the same search term as the search term identified in block 1304. In this manner, block 1308 may indicate whether any other visitors performed searches using the same search term.

Evaluation block 1310 represents evaluating whether any other activity records in the activity records file contain the same search term identified in block 1304. If block 1310 evaluates to "true" or "yes", then the process flows 1300 may proceed to block 1312, which represents accessing one or more activity records that contain this same search term. In other words, if the process flows 1300 take the Yes branch from block 1312, this would indicate two or more items were selected that resulted from the same search terms.

Block 1314 represents identifying any items associated with the activity records accessed in block 1312. Block 1314 may be similar to block 1306, but is performed on the one or more activity records that match the original activity record processed in block 1304.

Block 1316 represents evaluating whether the item identified in block 1306 is different than the item identified in block 1314. If these items are different, then two or more different items were selected by visitors after the visitors searched using the same terms. In this case, the process flows 1300 may take a Yes branch to block 1318.

Block 1318 represents establishing a similarity rating of the two items. FIG. 12 provides examples of the candidate items at 1204, and provides examples of the similarity rating at 1206. Block 1318 may include adjusting the similarity rating to reflect how closely the behavior or activities of the two items relate to one another. For example, if the two items were selected by two different visitors after these visitors performed similar activities or after the visitors provided similar search terms or criteria, then these two items may be strong candidates for synonym analysis.

Block 1320 represents adjusting the similarity ratings of the items based on the type of activity that the visitors performed in selecting the items. Different types of activity may have different levels of importance in assessing similarity of items. For example, block 1320 may accord more importance to activity that culminates in actual purchases of the items. Block 1320 may accord less importance to activity that culminates in browsing or viewing the items, but not actual purchases. Block 1320 may include providing indications of these candidate items and related similarity ratings to a synonym recognition unit (e.g., 128). In turn, the synonym recognition unit may factor-in the similarity rating when processing the documents.

Block 1322 represents selecting a next activity record in the activity records file for analysis. Afterwards, the process flows 1300 may return to block 1304, and repeat blocks 1304-1322 with this next activity record. As described above, FIG. 13 omits testing for end-of-file conditions in the interests of conciseness.

Referring to evaluation blocks 1310 and 1316, if the result of either of these blocks is negative, then the process flows 1300 may advance from either of those blocks to before block 1322, as shown in FIG. 13. In this manner, the process flows may bypass further processing of a current activity record, and select a next activity record for processing.

The tools and techniques shown in FIGS. 10-13 incorporate analysis of search term history and resultant visitor behavior into the processes of identifying synonyms. In some instances, the documents (e.g., 110, 112, and 114) provided by suppliers of items (e.g., 104, 106, and 108) may vary in quality and/or completeness, and these variances may impact the synonym detection and recognition processes, if these processes rely solely on the documents. By incorporating the search terms and resultant visitor behavior into the analysis, the tools and techniques shown in FIGS. 10-13 may reduce or offset the impact of these variances.

Figure 14:
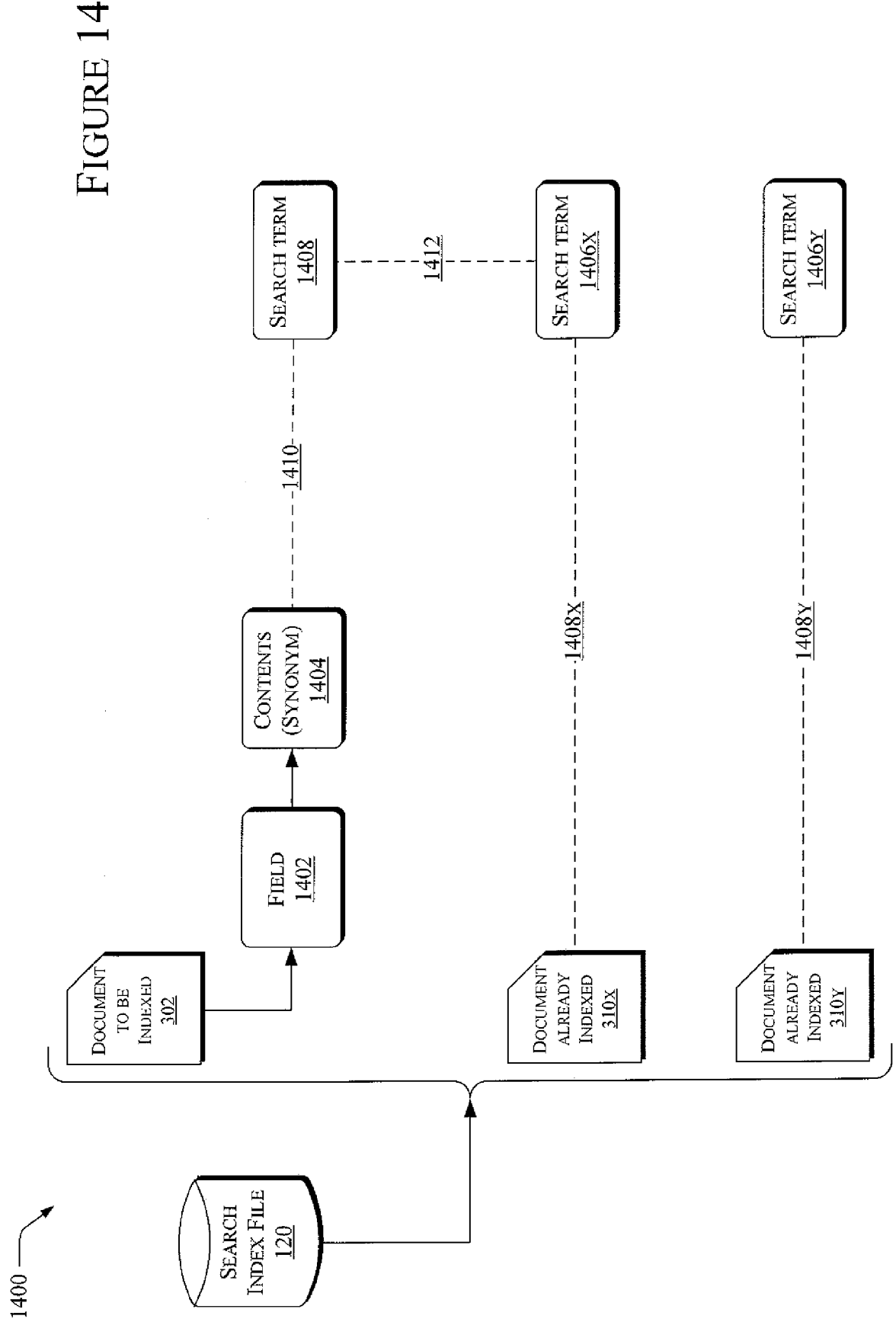
FIG. 14 is a block diagram of components and data flows related to merging detected candidate synonyms into the search index file.
Figure 15:
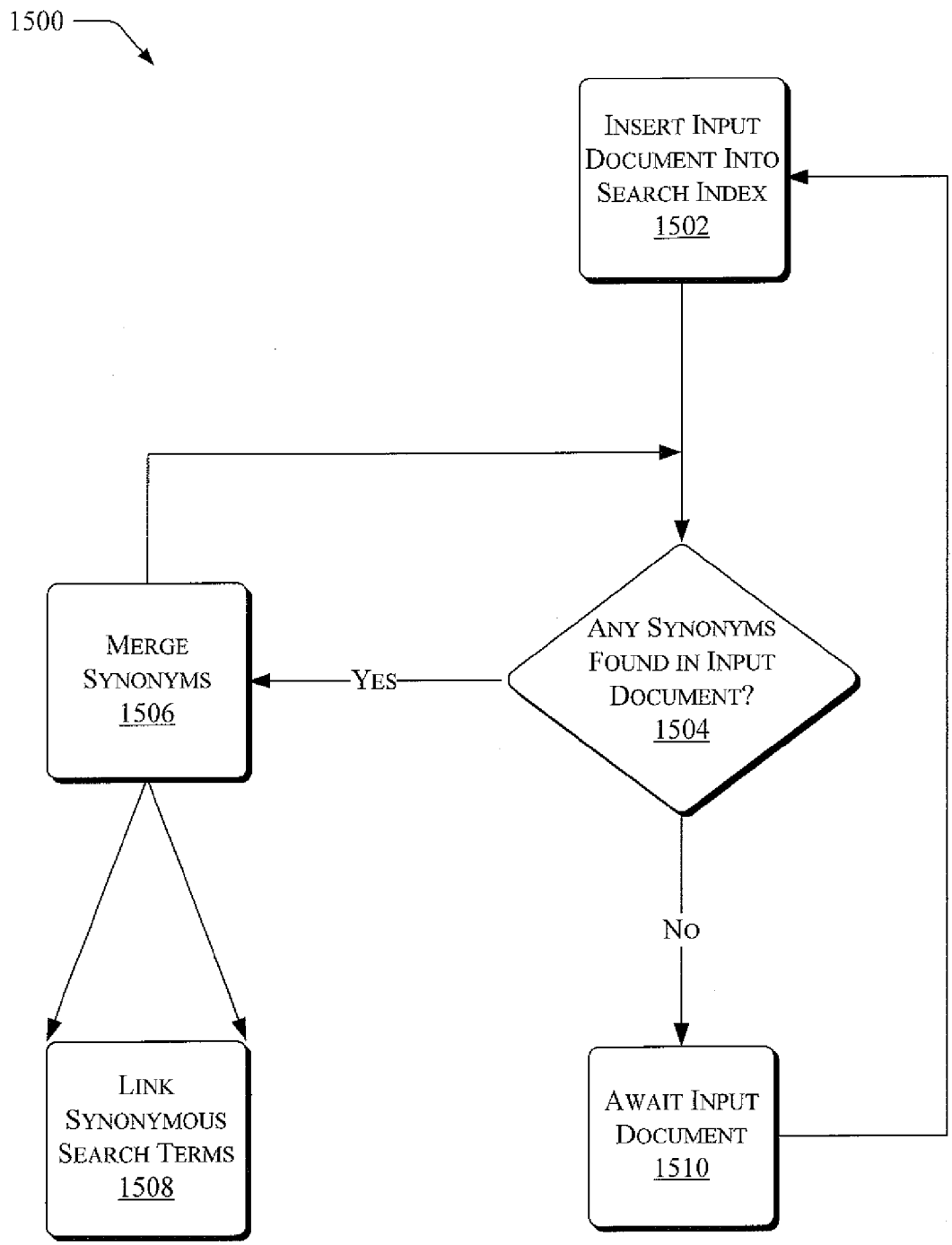
FIG. 15 is a flow diagram of a process for merging detected candidate synonyms into the search index file.
Figure 16:
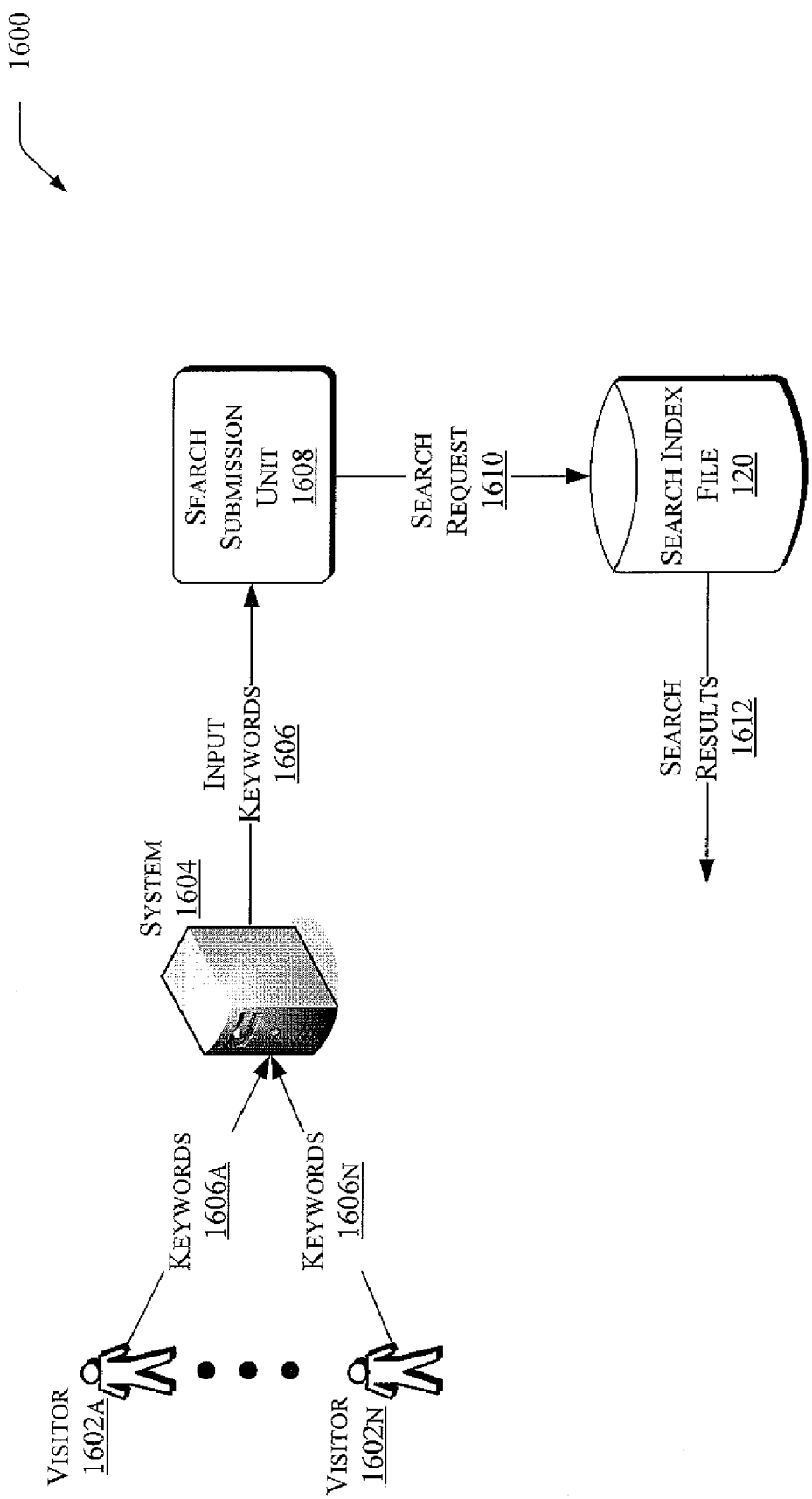
FIG. 16 is a block diagram of components and data flows for an operating environment related to searching techniques optimized by detecting synonyms and merging synonyms into search indexes.
Figure 17:
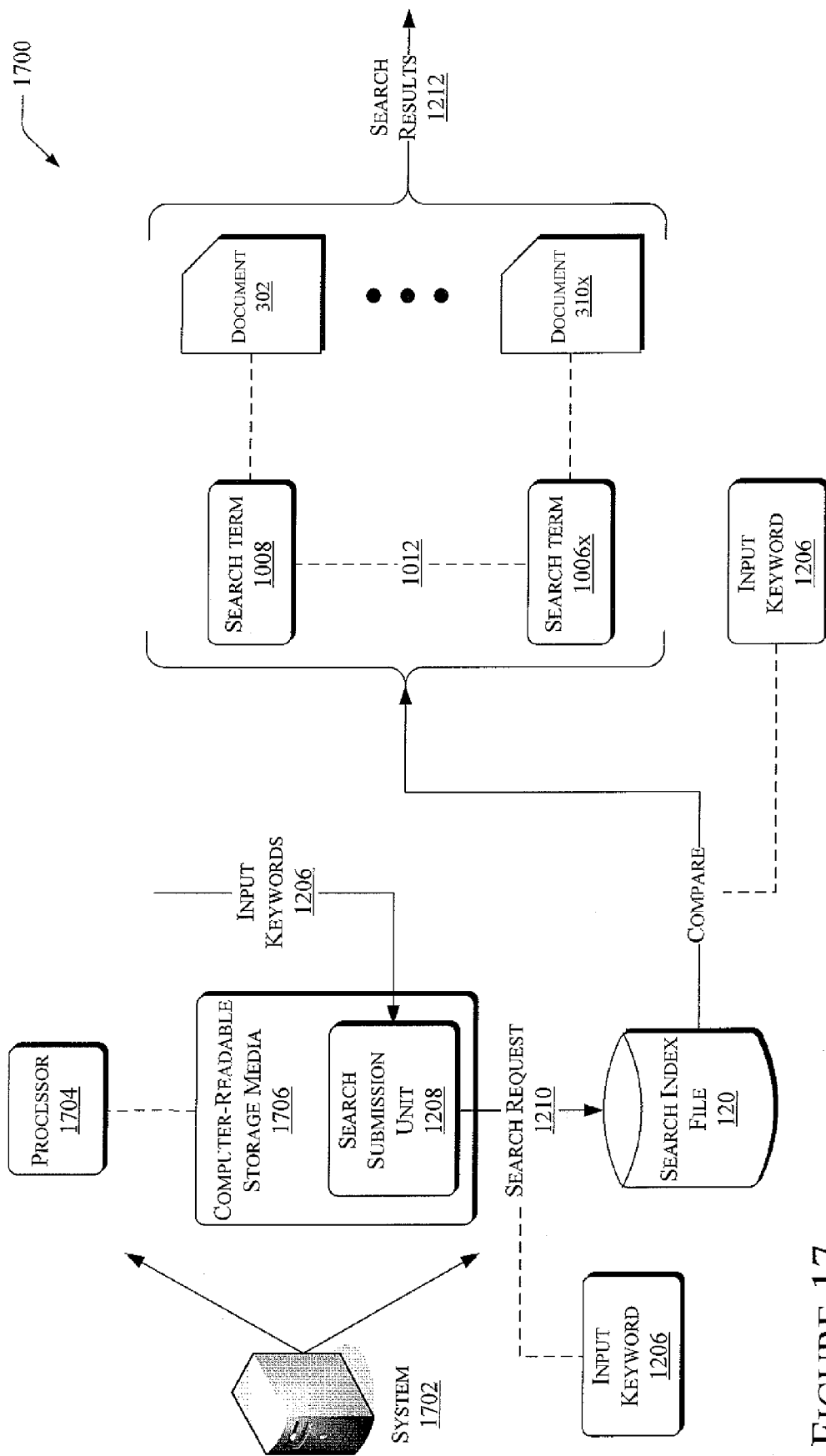
FIG. 17 is a block diagram of additional details of components and data flows for searching techniques optimized by detecting synonyms and merging synonyms into search indexes.

Having described the tools and techniques shown in FIGS. 10-13 for incorporating search terms and resultant visitor behavior into synonym recognition, the discussion now turns to a description of components and data flows related to merging detected candidate synonyms into the search index file, now presented with FIG. 14.

FIG. 14 illustrates components and data flows 1400 related to merging detected candidate synonyms into the search index file. For convenience and conciseness of description, but not to limit possible implementations, certain items described previously are carried forward into FIG. 14, and denoted by the same reference numbers.

The input document 302 to be indexed into the search index file 120 may include at least one field 1002 that is associated with content 1004. Using any of the techniques described previously, the content 1004 may be recognized as containing one or more candidate synonyms. More specifically, the content 1004 may contain synonyms with terms or phrases occurring within the documents 310x and 310y, which are already indexed into the search index file. As such, the search index file may have extracted search terms 1006x and 1006y, respectively, from these previously-indexed documents 310x and 310y, as represented by the dashed lines 1008x and 1008y.

In this scenario, assume that one or more terms or phrases occurring in the contents 1004 are candidate synonyms with terms or phrases that occur in the existing document 310x. These terms or phrases from the input document 302 may be extracted for use as search terms 1008, as represented by the dashed line 1010. However, because these terms or phrases are also candidate synonyms for terms in the document 310x, these terms or phrases may be merged with those terms in the document 310x, as represented by the dashed line 1012. As detailed with FIGS. 12 and 13 below, this association or linkage may enable optimizations at search-time.

Having described the components and data flows 1000 related to merging detected candidate synonyms into the search index file with FIG. 10, the discussion now turns to a description of a process for merging detected candidate synonyms into the search index file, now presented with FIG. 11.

FIG. 11 illustrates a process 1100 for merging detected candidate synonyms into the search index file. For convenience and conciseness of description, but not to limit possible implementations, the process 1100 is described in connection with components shown in FIGS. 1-10 above, for example, the synonym recognition unit 128 and components and data flows shown in FIG. 10. However, it is noted that at least portions of the process 1100 may be performed with other components without departing from the spirit and scope of the description herein.

Block 1102 represents indexing an input document (e.g., 302) into a search index file (e.g., 120). Block 1102 may include extracting search terms (e.g., 1008) from certain contents of the input document.

Block 1104 represents evaluating whether any synonyms have been found in the input document. For example, block 1104 may include evaluating whether any candidate synonyms (e.g., 502, 608, 808) have been reported for the input document. If so, the process 1100 may proceed to block 1106, which represents logically merging the synonyms in the input document (e.g., 1004) with any matching synonyms in one or more of the existing documents, such that a subsequent keyword search specifying one of the synonyms will also return all of the merged synonyms. More specifically, block 1106 may include linking synonymous search terms (e.g., 1012) within a data structure that stores the search terms, as represented by block 1108. The data structure may accomplish this linkage using any convenience mechanism that logically connects the synonyms appearing in different documents, e.g., pointers, handles, or other constructs. The search index file described herein (e.g., 120) is but one possible example of such a data structure.

Returning to decision block 1104, if no synonyms were recognized in the input document, then the process 1100 may proceed to block 1110, which represents awaiting the next input document for indexing into the search index file.

Having described the components and data flows 1100 related to merging detected candidate synonyms into the search index file with FIG. 11, the discussion now turns to a description of components and data flows related to searching techniques optimized by detecting synonyms and merging synonyms into search indexes, now presented with FIG. 12.

FIG. 12 illustrates components and data flows for an operating environment 1200 related to searching techniques optimized by detecting synonyms and merging synonyms into search indexes. FIG. 12 illustrates scenarios in which one or more visitors 1202 interact with a server-based system 1204, which may be, for example, a website. FIG. 12 shows two visitors 1202a and 1202n for convenience only, but the operating environment 1200 may support any number of visitors.

The visitors may search for resources on the server-based system by submitting keywords 1206. FIG. 12 shows two example keyword searches at 1206a and 1206n, as submitted respectively by visitors 1202a and 1202n. These keywords may relate to documents or web pages hosted on the server-based system, to goods and/or services available through the server-based system, or any other content that may be hosted for remote access.

In some instances, the server-based system 1204 may be the same as the system 102, which is shown in FIG. 1. In these instances, the server-based system 1204 and the system 102 may support both search-time activities as well as any preprocessing related to such search-time activities. In other instances, the server-based system 1204 may be separate from the system 102, with the server-based system 1204 dedicated to search-time activities and the system 102 dedicated to preprocessing functions.

In the scenario shown in FIG. 12, the input keywords 1206 as received from the visitors may be routed to a search submission unit 1208. The search submission unit 1208 formulates a search request 1210 that incorporates the input keywords 1206, and queries the search index file 120 with at least the input keywords 1206. More specifically, the search submission unit 1208 compares the input keywords 1206 to the search terms extracted from the search index file 120 (e.g., 1006 and 1008 in FIG. 10). Referring briefly to both FIGS. 10 and 12, if the input keywords 1206 correspond to any of the search terms within the search index file, then the documents (e.g., 302, 310) from which these search terms were extracted may be returned as search results 1212.

Assume, however, that the input keywords 1206 match with the search term 1008. Recall that during the pre-search processing shown in FIGS. 1-11, the search term 1008 may be linked not only to the document 302 from which the search term was extracted (e.g., 302), but also to any other documents that contain synonyms (e.g., 310x). Put differently, the search term 1008 as linked to the documents 302 and 310x effectively merges these two documents. The link 1012 provides an example mechanism for establishing this association between, for example, the documents 302 and 310x. Thus, if an input keyword 1224 matches the search term 1008, the search index file may return the document 302 from which the search term 1008 was extracted. However, by following any links 1012, the search index file may also locate and return any documents 310x that contain synonyms for the input keyword 1224, and have been merged with the document 302.

In this case, the search submission unit 1208 may submit only one search request 1210 for the input keywords 1206, but may still obtain search results 1212 that include any synonyms for the input keywords 1206. However, the search submission unit 1208 accomplishes this result without spawning and executing multiple search requests at search-time. By detecting synonyms during the preprocessing phase, and merging the synonyms in the search index file before search-time, the search submission unit 1208 effectively merges or combines searches across known synonyms ahead of time. In this manner, the search submission unit 1208 may avoid the overhead and search-time delays involved with performing multiple search requests.

Having described the operating environments 1200 with FIG. 12, the discussion now turns to a more detailed description of operating environments related to searching techniques optimized by detecting synonyms and merging synonyms into search indexes, now presented with FIG. 13.

FIG. 13 illustrates components and data flows for an operating environment 1300 related to searching techniques optimized by detecting synonyms and merging synonyms into search indexes. For convenience and conciseness of description, but not to limit possible implementations, certain items described previously are carried forward into FIG. 13, and denoted by the same reference numbers.

The operating environment 1300 may include a server-based system 1302, which may be similar to the server-based system 1204 shown in FIG. 12, but is referenced separately in FIG. 13 for convenience. The server-based system 1302 may include a processor 1306, which may communicate with a computer-readable storage medium 1306 to load computer-readable instructions and data therefrom for execution. The computer-readable storage medium 1306 may include the search submission unit 1208, which may include a collection of computer-readable instructions that, when loaded into the processor 1306 and executed, cause the server-based system 1302 to perform the functions described herein.

As described in FIGS. 12 and 13, the search submission unit 1208 may receive one or more input keywords 1206, and formulate the search request 1210 to incorporate the keyword 1206. The input keyword 1206 is matched against the search index file 120, more specifically, against any search terms exposed by the search index file. FIG. 12 shows two examples of such search terms at 1008 and 1006x. If the input keyword matches a search term (e.g., 1008) extracted from a first document (e.g., 302), and if the matched search term is merged with a search term (e.g., 1006x) extracted from another document (e.g., 310x), then the search may obtain both documents via a link between these synonym two merged documents (e.g., 1012). In this manner, the operating environment 1300 may return search results 1212 that include both documents 302 and 310x, as indicated in FIG. 13. In this manner, the operating environment 1300 capitalizes on the preprocessing described in FIGS. 1-11, which preprocessing merges synonyms to facilitate more efficient searching at search-time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
under control of one or more computer systems configured with executable instructions:
retrieving at least one activity record that represents at least one interaction between a visitor and a server-based system;
identifying within the activity record at least one input provided by the visitor during the interaction;
identifying within the activity record at least one item associated with the input;
accessing at least one further activity record containing the input;
comparing the activity record and the further activity record;
identifying within the further activity record at least one further item associated with the input;

establishing a similarity rating of the item and the further item based at least in part on the comparison of the activity record and the further activity record;

determining, based at least in part on the similarity rating of the item and the further item, that a document associated with the item and a further document associated with the further item contain synonyms;

designating a term that appears in the document associated with the item as a synonym for a different term that appears in the further document associated with the further item;

receiving a search query specifying at least the different term that appears in the further document; and returning, as search results for the search query, the further document associated with the further item and the document associated with the item containing the term that is the synonym for the different term.

2. The method of claim 1, wherein identifying within the activity record at least one input includes identifying at least one search term provided by the visitor.

3. The method of claim 1, wherein identifying within the activity record at least one input includes identifying at least one criterion provided by the visitor to an interactive merchandising UI element.

4. The method of claim 1, wherein establishing a similarity rating of the item and the further item includes considering how closely the activity records associated with the item and the further item relate to one another.

5. The method of claim 1, further comprising adjusting a weight accorded to the similarity rating, based on respective activity outcomes indicated in the activity record and the further activity record.

6. The method of claim 1, wherein adjusting a weight includes according higher weight to activity records indicating that the visitor completed a purchase of the item.

7. The method of claim 1, wherein retrieving at least one activity record includes retrieving the activity record from an activity records file.

8. The method of claim 1, wherein retrieving at least one activity record includes retrieving an activity record that contains a search term field that indicates at least one search term provided by the visitor during the interaction with the system.

9. The method of claim 1, wherein retrieving at least one activity record includes retrieving an activity record that contains an indication of an item that was selected by the visitor for an activity.

10. The method of claim 1, wherein retrieving at least one activity record includes retrieving an activity record that contains an indication of an item that was selected by the visitor for purchase.

11. The method of claim 1, wherein retrieving at least one activity record includes retrieving an activity record that contains an indication of an item that was selected by the visitor for browsing.

12. The method of claim 1, wherein retrieving at least one activity record includes retrieving an activity record that contains an indication of how long the visitor browsed information related to the item.

13. The method of claim 1, wherein retrieving at least one activity record includes retrieving an activity record that contains an indication that the visitor placed a representation of the item into an electronic shopping cart.

14. The method of claim 1, wherein retrieving at least one activity record includes retrieving an activity record that contains an indication that the visitor placed a representation of the item into an electronic wish list.

15. The method of claim 1, wherein identifying at least one search term includes accessing a search term field within the activity record.

16. The method of claim 1, further comprising searching a plurality of other activity records for the search term.

17. The method of claim 1, further comprising outputting indications of marked items as candidate items.

18. The method of claim 1, further comprising obtaining the document related to the item and the further document related to at least the further item.

19. The method of claim 18, further comprising identifying at least one similar aspect common between the document and the further document, identifying at least one dissimilar aspect between the document and the further document, and outputting the dissimilar aspect as a synonym.

20. The method of claim 18, further comprising identifying at least one dissimilar field that appears in the document and does not appear in the further document.

21. The method of claim 18, further comprising identifying at least one similar field that appears in the document and in the further document, and further comprising identifying dissimilar contents of the field that appear in the document and do not appear in the further document.

22. The method of claim 18, further comprising identifying at least one similar field that appears in the document and in the further document, identifying similar contents of the field that appear in the first document and the further document, and identifying dissimilar contents of the field that appear in the document and do not appear in the further document.

23. The method of claim 18, further comprising merging the at least one term appearing in the document with the at least a further term appearing in the further document.

24. A system comprising:

a memory and a processor;

a transaction analysis module stored in the memory and executable on the processor for:

retrieving at least one activity record that represents at least one interaction between a visitor and a server-based system;

identifying within the activity record at least one input provided by the visitor during the interaction;

identifying within the activity record at least one item associated with the input;

accessing at least one further activity record containing the input;

comparing the activity record and the further activity record;

identifying within the further activity record at least one further item associated with the input;

establishing a similarity rating of the item and the further item based at least in part on the comparison of the activity record and the further activity record;

a synonym recognition unit stored in the memory and executable on the processor, the synonym recognition unit being in communication with the transaction analysis module for:

receiving indications of the item and the further item and for receiving indications of the similarity rating;

obtaining a document associated with the item and obtaining at least a further document associated with the further item;

comparing the document to the further document;

determining, based at least in part on the similarity rating of the item and the further item, that the document associated with the item and the further document associated with the further item contain synonyms;

designating a term that appears in the document associated with the item as a synonym for a different term that appears in the further document associated with the further item; and a search engine stored in the memory and executable on the processor, the search engine being in communication with the synonym recognition unit for:

receiving a search query specifying at least the different term that appears in the further document; and returning, as search results for the search query, the further document associated with the further item and the document associated with the item containing the term that is the synonym for the different term.

25. The system of claim 24, wherein the transaction analysis module is for identifying within the activity record at least one search term provided by the visitor.

26. The system of claim 24, wherein the transaction analysis module is for identifying within the activity record at least one criterion provided by the visitor to an interactive UI element.

27. The system of claim 24, wherein the transaction analysis module is for establishing a similarity rating of the item and the further item by considering how closely the activity records associated with the item and the further item relate to one another.

28. The system of claim 24, wherein the transaction analysis module is for adjusting a weight accorded to the similarity rating, based on respective activity outcomes indicated in the activity record and the further activity record.

29. The system of claim 24, wherein the transaction analysis module is for according higher weight to activity records indicating that the visitor completed a purchase of the item.

30. The system of claim 24, wherein the transaction analysis module is for retrieving an activity record that contains an indication of an item that was selected by the visitor for an activity.

31. The system of claim 24, wherein the transaction analysis module is for retrieving at least one activity record that contains an indication of an item that was selected by the visitor for purchase.

32. The system of claim 24, wherein the transaction analysis module is for retrieving an activity record that contains an indication of an item that was selected by the visitor for browsing.

33. The system of claim 24, wherein the transaction analysis module is for retrieving an activity record that contains an indication of how long the visitor browsed information related to the item.

34. The system of claim 24, wherein the transaction analysis module is for retrieving an activity record that contains an indication that the visitor placed a representation of the item into an electronic shopping cart.

35. The system of claim 24, wherein the transaction analysis module is for retrieving an activity record that contains an indication that the visitor placed a representation of the item into an electronic wish list.

36. The system of claim 24, wherein the transaction analysis module is for outputting indications of marked items as candidate items.

37. The system of claim 24, wherein the synonym recognition unit is for performing at least one thresholding operation that includes comparing fields from the document to further fields from the further document to determine a degree of relationship between the document and the further document.

38. The system of claim 24, wherein the synonym recognition unit is for performing at least one thresholding operation that includes comparing contents of fields from the document to contents of further fields from the further document to determine a degree of relationship between the document and the further document.

39. The system of claim 37, wherein the synonym recognition unit is for determining that the degree of relationship indicates that the document is unlikely to contain synonyms that occur in the further document.

40. The system of claim 37, wherein the synonym recognition unit is for eliminating the further document from further analysis to detect synonyms with the document.

41. The system of claim 37, wherein the synonym recognition unit is for determining that the degree of relationship indicates that the document is likely to contain synonyms that occur in the further document.

42. The system of claim 37, wherein the synonym recognition unit is for selecting the further document for further analysis to detect synonyms with the document.

43. The system of claim 42, wherein the synonym recognition unit is for performing at least a further thresholding operation to determine a level of similarity between the document and the further document.

44. The system of claim 42, wherein the synonym recognition unit is for identifying similar fields between the document and the further document, and for identifying dissimilar fields between the document and the further document.

45. The system of claim 44, wherein the synonym recognition unit is for considering how many fields between the document and the further document are similar and how many fields are dissimilar, in determining whether the document contains any synonyms with terms that occur in the further document.

46. The system of claim 45, wherein the synonym recognition unit is for outputting the dissimilar fields as synonyms.

47. The system of claim 42, wherein the synonym recognition unit is for identifying similar content within at least one field that occurs within the document and the further document, and for identifying dissimilar content within the field.

48. The system of claim 47, wherein the synonym recognition unit is for considering how much content within the fields are similar and how much content within the fields are dissimilar, in determining whether the document contains any synonyms with terms that occur in the further document.

49. The system of claim 48, wherein the synonym recognition unit is for outputting the dissimilar content within the fields as synonyms.

50. The system of claim 48, wherein the synonym recognition unit is for outputting the dissimilar content within the fields as synonyms, in the context of the similar content within the fields.

51. The system of claim 24, wherein the synonym recognition unit is for identifying at least one dissimilar field that appears in the document and does not appear in the further document.

52. The system of claim 24, wherein the synonym recognition unit is for identifying at least one similar field that appears in the document and in the further document, and further comprising identifying dissimilar contents of the field that appear in the document and do not appear in the further document.

53. The system of claim 24, wherein the synonym recognition unit is for identifying at least one similar field that appears in the document and in the further document, identifying similar contents of the field that appear in the document and the further document, and identifying dissimilar contents of the field that appear in the document and do not appear in the further document.

54. The method of claim 1, wherein the documents associated with the item and the further item comprise information describing the item and the further item, respectively.

55. The method of claim 1, wherein the document related to the item and the further document related to the further item comprise individual web pages.

* * * * *